(12) United States Patent
Kelly et al.

(10) Patent No.: US 8,634,009 B2
(45) Date of Patent: Jan. 21, 2014

(54) DYNAMIC RANGE OPTIMIZATION IN A COMPRESSIVE IMAGING SYSTEM

(75) Inventors: Kevin F. Kelly, Houston, TX (US); Gary L. Woods, Houston, TX (US); Lenore McMackin, Austin, TX (US); Robert F. Bridge, Austin, TX (US); James M. Tidman, Round Rock, TX (US); Donna E. Hewitt, Austin, TX (US)

(73) Assignee: InView Technology Corporation, Austin, TX (US)

( * ) Notice: Subject to any disclaimer, the term of this patent is extended or adjusted under 35 U.S.C. 154(b) by 343 days.

(21) Appl. No.: 13/207,276

(22) Filed: Aug. 10, 2011

(65) Prior Publication Data

US 2012/0038805 A1   Feb. 16, 2012

Related U.S. Application Data

(60) Provisional application No. 61/372,826, filed on Aug. 11, 2010.

(51) Int. Cl.
 *H04N 3/14* (2006.01)
 *H04N 5/335* (2011.01)
 *H04N 5/225* (2006.01)

(52) U.S. Cl.
 USPC ............................ 348/300; 348/340; 348/344

(58) Field of Classification Search
 None
 See application file for complete search history.

(56) References Cited

U.S. PATENT DOCUMENTS

| | | | |
|---|---|---|---|
| 8,199,244 B2 | 6/2012 | Baraniuk et al. | |
| 2006/0239336 A1* | 10/2006 | Baraniuk et al. | 375/216 |
| 2010/0053352 A1* | 3/2010 | Dekel | 348/222.1 |
| 2012/0038789 A1 | 2/2012 | Kelly et al. | |
| 2012/0038790 A1 | 2/2012 | Kelly et al. | |

OTHER PUBLICATIONS

Stark, Craig; "Gain, Offset, and Bit Depth: What should I set my 'gain' and 'offset' to?;" Stark Labs, Jun. 4, 2008, retrieved from <http://www.stark-labs.com/help/blog/files/GainAndOffset.php> on Dec. 18, 2012; pp. 1-4.

"Dynamic range," Wikipedia, last modified Dec. 15, 2012, retrieved from <http://en.wikipedia.org/wiki/Dynamic_range> on Dec. 18, 2012; pp. 1-7.

(Continued)

*Primary Examiner* — Albert Cutler
(74) *Attorney, Agent, or Firm* — Meyertons Hood Kivlin Kowert & Goetzel, P.C.; Jeffrey C. Hood; Mark K. Brightwell

(57) ABSTRACT

A compressive imaging system for optimizing dynamic range during the acquisition of compressed images. A light modulator modulates incident light with spatial patterns to produced modulated light. A light sensing device generates an electrical signal representing intensity of the modulated light over time. The system amplifies a difference between the electrical signal and an adjustable baseline voltage and captures samples of the amplified signal. The adjustable baseline voltage is set to be approximately equal to the average value of the electrical signal. A compressive imaging system for identifying and correcting hot spot(s) in the incident light field. Search patterns are sent to the light modulator and the corresponding samples of the electrical signal are analyzed. Once the hot spot is located, the light modulating elements corresponding to the hot spot may be turned off or their duty cycle may be reduced.

23 Claims, 25 Drawing Sheets

(56) References Cited

OTHER PUBLICATIONS

"Analog-to-digital converter: ADC types;" Wikipedia, last modified Dec. 2, 2012, retrieved from <http://en.wikipedia.org/wiki/Analog-to-digital_converter#ADC_types> on Dec. 18, 2012; pp. 1-13.

Takhar et al.: "A New Compressive Imaging Camera Architecture using Optical-Domain Compression;" Society of Photo-Optical Instrumentation Engineers, Jan. 2006, retrieved from <http://dsp.rice.edu/sites/dsp.rice.edu/files/cs/cscam-SPIEJan06.pdf> on Dec. 18, 2012; pp. 1-10.

* cited by examiner

1800 amplify an electrical signal with an initial gain in order to obtain an initial amplified signal, where the electrical signal represents intensity of a modulated light stream as a function of time, where the modulated light stream is produced by modulating an incident stream of light with a sequence of spatial patterns 1810 acquire one or more samples of the initial amplified signal corresponding to one or more calibration patterns included in the sequence of spatial patterns  1820 determine an estimate of an average value of the electrical signal based on the one or more samples  1830 amplify a difference between the electrical signal and an adjustable baseline voltage with a second gain in order to obtain a second amplified signal, where the adjustable baseline voltage is approximately equal to the average value estimate for the electrical signal, where the second gain is larger than the first gain  1840 acquire samples of the second amplified signal corresponding to measurement patterns included in the sequence of spatial patterns  1850

Fig. 18A

1900 execute a search algorithm to identify a subset of the array of light modulating elements where intensity of the incident light stream is above an intensity threshold    1910 generate a sequence of spatial patterns {P(k)}    1912 modulate the incident stream of light with the sequence of spatial patterns {P(k)} to produce a modulated light stream $MLS_1$, where the action of modulating is performed by the array of light modulating elements    1914 receive samples $\{I_1(k)\}$ of an electrical signal produced by the light sensing device, where the samples $\{I_1(k)\}$ represent intensity of the modulated light stream $MLS_1$ as a function of time    1916 operate on the samples $\{I_1(k)\}$ to identify the subset    1918

Fig. 19

DYNAMIC RANGE OPTIMIZATION IN A COMPRESSIVE IMAGING SYSTEM

RELATED APPLICATION DATA

This application claims the benefit of priority to U.S. Provisional Application No. 61/372,826, filed on Aug. 11, 2010, entitled "Compressive Sensing Systems and Methods", invented by Richard Baraniuk, Gary Woods, Kevin Kelly, Robert Bridge, Sujoy Chatterjee and Lenore McMackin, which is hereby incorporated by reference in its entirety as though fully and completely set forth herein.

FIELD OF THE INVENTION

The present invention relates to the field of compressive sensing, and more particularly to systems and methods for determining the variation of background light level during the capture of image/video information using compressive sensing hardware.

DESCRIPTION OF THE RELATED ART

According to Nyquist theory, a signal x(t) whose signal energy is supported on the frequency interval [−B,B] may be reconstructed from samples {x(nT)} of the signal x(t), provided the rate $f_S=1/T_S$ at which the samples are captured is sufficiently high, i.e., provided that $f_S$ is greater than 2B. Similarly, for a signal whose signal energy is supported on the frequency interval [A,B], the signal may be reconstructed from samples captured with sample rate greater than B-A. A fundamental problem with any attempt to capture a signal x(t) according to Nyquist theory is the large number of samples that are generated, especially when B (or B-A) is large. The large number of samples is taxing on memory resources and on the capacity of transmission channels.

Nyquist theory is not limited to functions of time. Indeed, Nyquist theory applies more generally to any function of one or more real variables. For example, Nyquist theory applies to functions of two spatial variables such as images, to functions of time and two spatial variables such as video, and to the functions used in multispectral imaging, hyperspectral imaging, medical imaging and a wide variety of other applications. In the case of an image I(x,y) that depends on spatial variables x and y, the image may be reconstructed from samples of the image, provided the samples are captured with sufficiently high spatial density. For example, given samples {I(nΔx, mΔy)} captured along a rectangular grid, the horizontal and vertical densities 1/Δx and 1/Δy should be respectively greater than $2B_x$ and $2B_y$, where $B_x$ and $B_y$ are the highest x and y spatial frequencies occurring in the image I(x,y). The same problem of overwhelming data volume is experienced when attempting to capture an image according to Nyquist theory. The modern theory of compressive sensing is directed to such problems.

Compressive sensing relies on the observation that many signals (e.g., images or video sequences) of practical interest are not only band-limited but also sparse or approximately sparse when represented using an appropriate choice of transformation, for example, a transformation such as a Fourier transform, a wavelet transform or a discrete cosine transform (DCT). A signal vector v is said to be K-sparse with respect to a given transformation T when the transformation of the signal vector, Tv, has no more than K non-zero coefficients. A signal vector v is said to be sparse with respect to a given transformation T when it is K-sparse with respect to that transformation for some integer K much smaller than the number L of components in the transformation vector Tv.

A signal vector v is said to be approximately K-sparse with respect to a given transformation T when the coefficients of the transformation vector, Tv, are dominated by the K largest coefficients (i.e., largest in the sense of magnitude or absolute value). In other words, if the K largest coefficients account for a high percentage of the energy in the entire set of coefficients, then the signal vector v is approximately K-sparse with respect to transformation T. A signal vector v is said to be approximately sparse with respect to a given transformation T when it is approximately K-sparse with respect to the transformation T for some integer K much less than the number L of components in the transformation vector Tv.

Given a sensing device that captures images with N samples per image and in conformity to the Nyquist condition on spatial rates, it is often the case that there exists some transformation and some integer K very much smaller than N such that the transform of each captured image will be approximately K sparse. The set of K dominant coefficients may vary from one image to the next. Furthermore, the value of K and the selection of the transformation may vary from one context (e.g., imaging application) to the next. Examples of typical transforms that might work in different contexts are the Fourier transform, the wavelet transform, the DCT, the Gabor transform, etc.

Compressive sensing specifies a way of operating on the N samples of an image so as to generate a much smaller set of samples from which the N samples may be reconstructed, given knowledge of the transform under which the image is sparse (or approximately sparse). In particular, compressive sensing invites one to think of the N samples as a vector v in an N-dimensional space and to imagine projecting the vector v onto each vector in a series of M vectors {R(i)} in the N-dimensional space, where M is larger than K but still much smaller than N. Each projection gives a corresponding real number s(i), e.g., according to the expression $$s(i)=<v,R(i)>,$$

where the notation <v,R(i)> represents the inner product (or dot product) of the vector v and the vector R(i). Thus, the series of M projections gives a vector U including M real numbers. Compressive sensing theory further prescribes methods for reconstructing (or estimating) the vector v of N samples from the vector U of M real numbers. For example, according to one method, one should determine the vector x that has the smallest length (in the sense of the $L_1$ norm) subject to the condition that ΦTx=U, where Φ is a matrix whose rows are the transposes of the vectors R(i), where T is the transformation under which the image is K sparse or approximately K sparse.

Compressive sensing is important because, among other reasons, it allows reconstruction of an image based on M measurements instead of the much larger number of measurements N recommended by Nyquist theory. Thus, for example, a compressive sensing camera would be able to capture a significantly larger number of images for a given size of image store, and/or, transmit a significantly larger number of images per unit time through a communication channel of given capacity.

As mentioned above, compressive sensing operates by projecting the image vector v onto a series of M vectors. As discussed in U.S. patent application Ser. No. 11/379,688 (published as 2006/0239336 and invented by Baraniuk et al.) and illustrated in FIG. 1, an imaging device (e.g., camera) may be configured to take advantage of the compressive sensing paradigm by using a digital micromirror device (DMD) 40. An incident lightfield 10 passes through a lens 20 and then interacts with the DMD 40. The DMD includes a two-dimensional array of micromirrors, each of which is configured to independently and controllably switch between two orientation states. Each micromirror reflects a corresponding portion of the incident light field based on its instantaneous orientation. Any micromirrors in a first of the two orientation states will reflect their corresponding light portions so that they pass through lens 50. Any micromirrors in a second of the two orientation states will reflect their corresponding light portions away from lens 50. Lens 50 serves to concentrate the light portions from the micromirrors in the first orientation state onto a photodiode (or photodetector) situated at location 60. Thus, the photodiode generates a signal whose amplitude at any given time represents a sum of the intensities of the light portions from the micromirrors in the first orientation state.

The compressive sensing is implemented by driving the orientations of the micromirrors through a series of spatial patterns. Each spatial pattern specifies an orientation state for each of the micromirrors. The output signal of the photodiode is digitized by an A/D converter 70. In this fashion, the imaging device is able to capture a series of measurements {s(i)} that represent inner products (dot products) between the incident light field and the series of spatial patterns without first acquiring the incident light field as a pixelized digital image. The incident light field corresponds to the vector v of the discussion above, and the spatial patterns correspond to the vectors R(i) of the discussion above.

The incident light field may be modeled by a function $I(x,y,t)$ of two spatial variables and time. Assuming for the sake of discussion that the DMD comprises a rectangular array. The DMD implements a spatial modulation of the incident light field so that the light field leaving the DMD in the direction of the lens 50 might be modeled by $$\{I(n\Delta x, m\Delta y, t)*M(n,m,t)\}$$

where m and n are integer indices, where $I(n\Delta x, m\Delta y, t)$ represents the portion of the light field that is incident upon that $(n,m)^{th}$ mirror of the DMD at time t. The function $M(n,m,t)$ represents the orientation of the $(n,m)^{th}$ mirror of the DMD at time t. At sampling times, the function $M(n,m,t)$ equals one or zero, depending on the state of the digital control signal that controls the $(n,m)^{th}$ mirror. The condition $M(n,m,t)=1$ corresponds to the orientation state that reflects onto the path that leads to the lens 50. The condition $M(n,m,t)=0$ corresponds to the orientation state that reflects away from the lens 50.

The lens 50 concentrates the spatially-modulated light field $$\{I(n\Delta x, m\Delta y, t)*M(n,m,t)\}$$

onto a light sensitive surface of the photodiode. Thus, the lens and the photodiode together implement a spatial summation of the light portions in the spatially-modulated light field:

$$S(t) = \sum_{n,m} I(n\Delta x, m\Delta y, t) M(n, m, t).$$

Signal S(t) may be interpreted as the intensity at time t of the concentrated spot of light impinging upon the light sensing surface of the photodiode. The A/D converter captures measurements of S(t). In this fashion, the compressive sensing camera optically computes an inner product of the incident light field with each spatial pattern imposed on the mirrors. The multiplication portion of the inner product is implemented by the mirrors of the DMD. The summation portion of the inner product is implemented by the concentrating action of the lens and also the integrating action of the photodiode.

In a compressive sensing (CS) device such as that described above, the quality of image reconstruction may suffer if the measurements of signal S(t) are not captured with sufficiently high resolution. Furthermore, intensely bright spots in the incident light field may make it more difficult to detect the small scale variations in signal S(t) that are needed to reconstruct the remaining portions of the incident light field. Thus, there exists a need for mechanisms capable of increasing (or optimizing) the resolution with which sensor measurements can be obtained in a CS device, and a need for mechanisms capable of decreasing (or eliminating) the negative effects of hot spots in the incident light field.

SUMMARY

In one set of embodiments, a system may be configured to include a light sensing device, an amplifier, an analog-to-digital converter (ADC) and a switching subsystem.

The light sensing device may be configured to receive a modulated light stream and to generate an electrical signal that represents intensity of the modulated light stream as a function of time. The modulated light stream is produced by modulating an incident stream of light with a sequence of spatial patterns.

The amplifier may be configured to amplify an input signal in order to obtain an amplified signal. The gain of the amplifier is controllable.

The ADC may be configured to sample the amplified signal in order to obtain a sequence of samples.

The switching subsystem may be configured to controllably select one of the following to be the input signal to the amplifier: (a) the electrical signal from the light sensing device, or (b) a difference signal representing a difference between the electrical signal and an adjustable baseline voltage.

In an initial mode, the system may set the gain of the amplifier to a relatively low value, direct the switching subsystem to select the electrical signal from the light sensing device as the input to the amplifier, and then estimate the average value of the electrical signal based on samples captured from the ADC. The average value may be used to compute a standard deviation of the electrical signal. When the spatial patterns used by the modulated the incident light stream are random (or pseudo-random), the standard deviation of the electrical signal may be approximated by $AVG/\sqrt{N}$, where AVG is the average value of the electrical signal, and where N is the number of light modulating elements in the light modulation unit.

In a signal acquisition mode, the system may set the gain of amplifier to a larger value that is based on the estimated standard deviation, and direct the switching subsystem to select the difference signal. The adjustable baseline voltage is equal to (or approximately equal to) the average value of the electrical signal. Thus, the difference signal is equal to (or approximately equal to, or roughly equal to) the AC component of the electrical signal. The system may employ various mechanisms for generating the adjustable baseline voltage. For example, may use an digital-to-analog converter to generate the adjustable baseline voltage. As another example, the system may filter the electrical signal using a lowpass filter.

In another set of embodiments, a system may be configured to include a light modulation unit, a light sensing device, a processor and memory.

The light modulation unit may be configured to modulate an incident light stream, where the light modulation unit includes an array of light modulating elements.

The memory stores program instructions, where the program instructions, when executed by the processor, cause the processor to perform a search to identify a subset of the array of light modulating elements where intensity of the incident light stream is above an intensity threshold. The search includes supplying a first sequence of spatial patterns to the light modulation unit so that the light modulation unit modulates the incident light stream with a first sequence of spatial patterns and thereby produces a first modulated light stream. The search also includes: receiving first samples of an electrical signal produced by the light sensing device, where the first samples represent intensity of the first modulated light stream as a function of time; and operating on the first samples to identify said subset.

Various additional embodiments are described in U.S. Provisional Application No. 61/372,826, which is hereby incorporated by reference in its entirety as though fully and completely set forth herein.

For information on how to determine and remove variation in background light level in a compressive imaging system, please refer to the following patent applications, each of which is hereby incorporated by reference in its entirety as though fully and completely set forth herein: (A) U.S. application Ser. No. 13/193,553, filed on Jul. 28, 2011, invented by Richard Baraniuk, Kevin Kelly, Robert Bridge, Sujoy Chatterjee and Lenore McMackin, titled "Determining Light Level Variation in Compressive Imaging by Injecting Calibration Patterns into Pattern Sequence"; and (B) U.S. application Ser. No. 13/193,556, filed on Jul. 28, 2011, invented by Richard Baraniuk, Kevin Kelly, Robert Bridge, Sujoy Chatterjee and Lenore McMackin, titled "Low-Pass Filtering of Compressive Imaging Measurements to Infer Light Level Variation".

BRIEF DESCRIPTION OF THE DRAWINGS

A better understanding of the present invention can be obtained when the following detailed description of the preferred embodiments is considered in conjunction with the following drawings.

FIG. 18A illustrates an embodiment of a method 1800 for improving the quality of compressive imaging measurements.

FIG. 19 illustrates one embodiment of a method 1900 for identifying high-intensity regions (e.g., hot spots) in an incident light stream.

Figure 1:
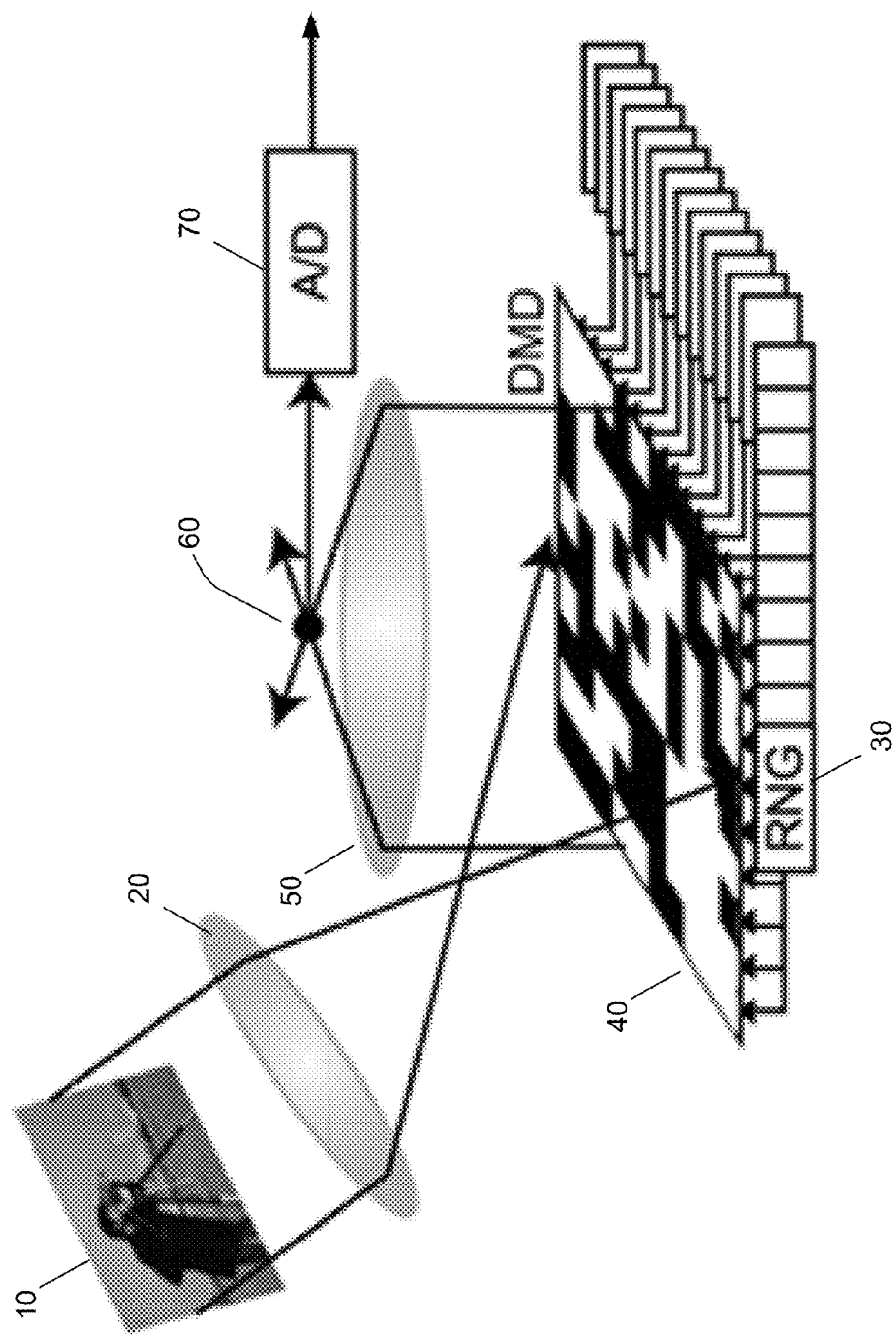
FIG. 1 illustrates a compressive sensing camera according to the prior art.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The following patent applications provide teachings regarding compressive sensing and compressive imaging:

U.S. Provisional Application No. 60/673,364 entitled "Method and Apparatus for Optical Image Compression," filed on Apr. 21, 2005;

U.S. Provisional Application No. 60/679,237 entitled "Method and Apparatus for Reconstructing Data from Multiple Sources," filed on May 10, 2005;

U.S. Provisional Application No. 60/729,983 entitled "Random Filters for Compressive Sampling and Reconstruction," filed on Oct. 25, 2005;

U.S. Provisional Application No. 60/732,374 entitled "Method and Apparatus for Compressive Sensing for Analog-to-Information Conversion," filed on Nov. 1, 2005;

U.S. Provisional Application No. 60/735,616 entitled "Method and Apparatus for Distributed Compressed Sensing," filed on Nov. 10, 2005;

U.S. Provisional Application No. 60/759,394 entitled "Sudocodes: Efficient Compressive Sampling Algorithms for Sparse Signals," filed on Jan. 16, 2006;

U.S. patent application Ser. No. 11/379,688 entitled "Method and Apparatus for Compressive Imaging Device", filed on Apr. 21, 2006; and U.S. patent application Ser. No. 12/791,171 entitled "Method and Apparatus for Compressive Imaging Device", filed on Jun. 1, 2010.

Terminology

A memory medium is a non-transitory medium configured for the storage and retrieval of information. Examples of memory media include: various kinds of semiconductor-based memory such as RAM and ROM; various kinds of magnetic media such as magnetic disk, tape, strip and film; various kinds of optical media such as CD-ROM and DVD-ROM; various media based on the storage of electrical charge and/or any of a wide variety of other physical quantities; media fabricated using various lithographic techniques; etc. The term "memory medium" includes within its scope of meaning the possibility that a given memory medium might be a union of two or more memory media that reside at different locations, e.g., on different chips in a system or on different computers in a network. A memory medium is typically computer-readable, e.g., is capable of being read by a computer.

A computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

A computer system is any device (or combination of devices) having at least one processor that is configured to execute program instructions stored on a memory medium. Examples of computer systems include personal computers (PCs), workstations, laptop computers, tablet computers, mainframe computers, server computers, client computers, network or Internet appliances, hand-held devices, mobile devices, personal digital assistants (PDAs), computer-based television systems, grid computing systems, wearable computers, computers implanted in living organisms, computers embedded in head-mounted displays, computers embedded in sensors forming a distributed network, etc.

A programmable hardware element (PHE) is a hardware device that includes multiple programmable function blocks connected via a system of programmable interconnects. Examples of PHEs include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores).

As used herein, the term "light" is meant to encompass within its scope of meaning any electromagnetic radiation whose spectrum lies within the wavelength range $[\lambda_L, \lambda_U]$, where the wavelength range includes the visible spectrum, the ultra-violet (UV) spectrum, infrared (IR) spectrum and the terahertz (THz) spectrum. Thus, for example, visible radiation, or UV radiation, or IR radiation, or THz radiation, or any combination thereof is "light" as used herein.

In some embodiments, a computer system may be configured to include a processor (or a set of processors) and a memory medium, where the memory medium stores program instructions, where the processor is configured to read and execute the program instructions stored in the memory medium, where the program instructions are executable by the processor to implement a method, e.g., any of the various method embodiments described herein, or, any combination of the method embodiments described herein, or, any subset of any of the method embodiments described herein, or, any combination of such subsets.

System 100 for Operating on Light

Figure 2A:
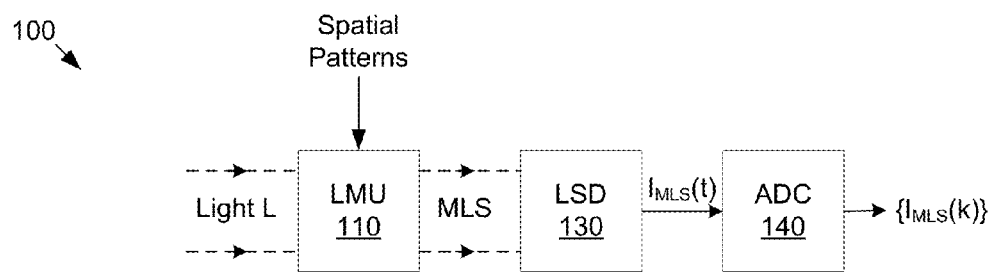
FIG. 2A illustrates one embodiment of a system 100 that is operable to capture compressive imaging samples and also samples of background light level. (LMU is an acronym for "light modulation unit". MLS is an acronym for "modulated light stream". LSD is an acronym for "light sensing device".)

A system 100 for operating on light may be configured as shown in FIG. 2A. The system 100 may include a light modulation unit 110, a light sensing device 130 and an analog-to-digital converter (ADC) 140.

The light modulation unit 110 is configured to modulate a received stream of light L with a series of spatial patterns in order to produce a modulated light stream (MLS). The spatial patterns of the series may be applied sequentially to the light stream so that successive time slices of the light stream are modulated, respectively, with successive ones of the spatial patterns. (The action of sequentially modulating the light stream L with the spatial patterns imposes the structure of time slices on the light stream.) The light modulation unit 110 includes a plurality of light modulating elements configured to modulate corresponding portions of the light stream. Each of the spatial patterns specifies an amount (or extent or value) of modulation for each of the light modulating elements. Mathematically, one might think of the light modulation unit's action of applying a given spatial pattern as performing an element-wise multiplication of a light field vector $(x_{ij})$ representing a time slice of the light stream L by a vector of scalar modulation values $(m_{ij})$ to obtain a time slice of the modulated light stream: $(m_{ij})*(x_{ij})=(m_{ij}*x_{ij})$. The vector $(m_{ij})$ is specified by the spatial pattern. Each light modulating element effectively scales (multiplies) the intensity of its corresponding stream portion by the corresponding scalar factor.

The light modulation unit 110 may be realized in various ways. In some embodiments, the LMU 110 may be realized by a plurality of mirrors (e.g., micromirrors) whose orientations are independently controllable. In another set of embodiments, the LMU 110 may be realized by an array of elements whose transmittances are independently controllable, e.g., as with an array of LCD shutters. An electrical control signal supplied to each element controls the extent to which light is able to transmit through the element. In yet another set of embodiments, the LMU 110 may be realized by an array of independently-controllable mechanical shutters (e.g., micromechanical shutters) that cover an array of apertures, with the shutters opening and closing in response to electrical control signals, thereby controlling the flow of light through the corresponding apertures. In yet another set of embodiments, the LMU 110 may be realized by a perforated mechanical plate, with the entire plate moving in response to electrical control signals, thereby controlling the flow of light through the corresponding perforations. In yet another set of embodiments, the LMU 110 may be realized by an array of transceiver elements, where each element receives and then retransmits light in a controllable fashion. In yet another set of embodiments, the LMU 110 may be realized by a grating light valve (GLV) device. In yet another embodiment, the LMU 110 may be realized by a liquid-crystal-on-silicon (LCOS) device.

In some embodiments, the light modulating elements are arranged in an array, e.g., a two-dimensional array or a one-dimensional array. Any of various array geometries are contemplated. For example, in some embodiments, the array is a square array or rectangular array. In another embodiment, the array is hexagonal. In some embodiments, the light modulating elements are arranged in a spatially random fashion.

Let N denote the number of light modulating elements in the light modulation unit 110. In various embodiments, the number N may take a wide variety of values. For example, in different sets of embodiments, N may be, respectively, in the range [64, 256], in the range [256, 1024], in the range [1024, 4096], in the range $[2^{12},2^{14}]$, in the range $[2^{14},2^{16}]$, in the range $[2^{16},2^{18}]$, in the range $[2^{18},2^{20}]$, in the range $[2^{20},2^{22}]$, in the range $[2^{22},2^{24}]$, in the range $[2^{24},2^{26}]$, in the range from $2^{26}$ to infinity. The particular value used in any given embodiment may depend on one or more factors specific to the embodiment.

The light sensing device 130 is configured to receive the modulated light stream MLS and to generate an analog electrical signal $I_{MLS}(t)$ representing intensity of the modulated light stream as a function of time.

The light sensing device 130 may include one or more light sensing elements. The term "light sensing element" may be interpreted as meaning "a transducer between a light signal and an electrical signal". For example, a photodiode is a light sensing element. In various other embodiments, light sensing elements might include devices such as metal-semiconductor-metal (MSM) photodetectors, phototransistors, phototubes and photomultiplier tubes.

In some embodiments, the light sensing device 130 includes one or more amplifiers (e.g., transimpedance amplifiers) to amplify the analog electrical signals generated by the one or more light sensing elements.

The ADC 140 acquires a sequence of samples $\{I_{MLS}(k)\}$ of the analog electrical signal $I_{MLS}(t)$. Each of the samples may be interpreted as an inner product between a corresponding time slice of the light stream L and a corresponding one of the spatial patterns. The set of samples $\{I_{MLS}(k)\}$ comprises an encoded representation, e.g., a compressed representation, of an image (or a video sequence) and may be used to construct the image (or video sequence) based on any construction algorithm known in the field of compressive sensing. (For video sequence construction, the samples may be partitioned into contiguous subsets, and then the subsets may be processed to construct corresponding images.)

In some embodiments, the samples $\{I_{MLS}(k)\}$ may be used for some purpose other than, or in addition to, image (or video) construction. For example, system 100 (or some other system) may operate on the compensated samples to perform an inference task, such as detecting the presence of a signal or object, identifying a signal or an object, classifying a signal or an object, estimating one or more parameters relating to a signal or an object, tracking a signal or an object, etc. In some embodiments, an object under observation by system 100 may be identified or classified by virtue of its sample set $\{I_{MLS}(k)\}$, or parameters derived from that sample set, being similar to one of a collection of stored sample sets (or parameter sets).

In some embodiments, the light sensing device 130 includes exactly one light sensing element. (For example, the single light sensing element may be a photodiode.) The light sensing element may couple to an amplifier (e.g., a TIA) (e.g., a multi-stage amplifier).

In some embodiments, the light sensing device 130 may include a plurality of light sensing elements (e.g., photodiodes). Each light sensing element may convert light impinging on its light sensing surface into a corresponding analog electrical signal representing intensity of the impinging light as a function of time. In some embodiments, each light sensing element may couple to a corresponding amplifier so that the analog electrical signal produced by the light sensing element can be amplified prior to digitization. System 100 may be configured so that each light sensing element receives, e.g., a corresponding spatial portion (or spectral portion) of the modulated light stream.

In one embodiment, the analog electrical signals produced, respectively, by the light sensing elements may be summed to obtain a sum signal. The sum signal may then be digitized by the ADC 140 to obtain the sequence of samples $\{I_{MLS}(k)\}$. In another embodiment, the analog electrical signals may be individually digitized, each with its own ADC, to obtain corresponding sample sequences. The sample sequences may then be added to obtain the sequence $\{I_{MLS}(k)\}$. In another embodiment, the analog electrical signals produced by the light sensing elements may be sampled by a smaller number of ADCs than light sensing elements through the use of time multiplexing. For example, in one embodiment, system 100 may be configured to sample two or more of the analog electrical signals by switching the input of an ADC among the outputs of the two or more corresponding light sensing elements at a sufficiently high rate.

In some embodiments, the light sensing device 130 may include an array of light sensing elements. Arrays of any of a wide variety of sizes, configurations and material technologies are contemplated. In one embodiment, the light sensing device 130 includes a focal plane array coupled to a readout integrated circuit. In one embodiment, the light sensing device 130 may include an array of cells, where each cell includes a corresponding light sensing element and is configured to integrate and hold photo-induced charge created by the light sensing element, and to convert the integrated charge into a corresponding cell voltage. The light sensing device may also include (or couple to) circuitry configured to sample the cell voltages using one or more ADCs.

In some embodiments, the light sensing device 130 may include a plurality (or array) of light sensing elements, where each light sensing element is configured to receive a corresponding spatial portion of the modulated light stream, and each spatial portion of the modulated light stream comes from a corresponding sub-region of the array of light modulating elements. (For example, the light sensing device 130 may include a quadrant photodiode, where each quadrant of the photodiode is configured to receive modulated light from a corresponding quadrant of the array of light modulating elements. As another example, the light sensing element 130 may include a bi-cell photodiode.) Each light sensing element generates a corresponding signal representing intensity of the corresponding spatial portion as a function of time. Each signal may be digitized (e.g., by a corresponding ADC) to obtain a corresponding sequence of samples. Each sequence of samples may be processed to recover a corresponding sub-image. The sub-images may be joined together to form a whole image.

In some embodiments, the light sensing device 130 includes a small number of light sensing elements (e.g., in respective embodiments, one, two, less than 8, less than 16, less the 32, less than 64, less than 128, less than 256). Because the light sensing device of these embodiments includes a small number of light sensing elements (e.g., far less than the typical modern CCD-based or CMOS-based camera), an entity configuring any of these embodiments may afford to spend more per light sensing element to realize features that are beyond the capabilities of modern array-based image sensors of large pixel count, e.g., features such as higher sensitivity, extended range of sensitivity, new range(s) of sensitivity, extended dynamic range, higher bandwidth/lower response time. Furthermore, because the light sensing device includes a small number of light sensing elements, an entity configuring any of these embodiments may use newer light sensing technologies (e.g., based on new materials or combinations of materials) that are not yet mature enough to be manufactured into focal plane arrays (FPA) with large pixel count. For example, new detector materials such as superlattices, quantum dots, carbon nanotubes and graphene can significantly enhance the performance of IR detectors by reducing detector noise, increasing sensitivity, and/or decreasing detector cooling requirements.

In one embodiment, the light sensing device 130 is a thermo-electrically cooled InGaAs detector. (InGaAs stands for "Indium Gallium Arsenide".) In other embodiments, the InGaAs detector may be cooled by other mechanisms (e.g., liquid nitrogen or a Sterling engine). In yet other embodiments, the InGaAs detector may operate without cooling. In yet other embodiments, different detector materials may be used, e.g., materials such as MCT (mercury-cadmium-telluride), InSb (Indium Antimonide) and VOx (Vanadium Oxide).

In different embodiments, the light sensing device 130 may be sensitive to light at different wavelengths or wavelength ranges. In some embodiments, the light sensing device 130 may be sensitive to light over a broad range of wavelengths, e.g., over the entire visible spectrum or over the entire range $[\lambda_L, \lambda_U]$ as defined above.

In some embodiments, the light sensing device 130 may include one or more dual-sandwich photodetectors. A dual sandwich photodetector includes two photodiodes stacked (or layered) one on top of the other.

In one embodiment, the light sensing device 130 may include one or more avalanche photodiodes.

In some embodiments, a filter may be placed in front of the light sensing device 130 to restrict the modulated light stream to a specific range of wavelengths or polarization. Thus, the signal $I_{MLS}(t)$ generated by the light sensing device 130 may be representative of the intensity of the restricted light stream. For example, by using a filter that passes only IR light, the light sensing device may be effectively converted into an IR detector. The sample principle may be applied to effectively convert the light sensing device into a detector for red or blue or green or UV or any desired wavelength band, or, a detector for light of a certain polarization.

In some embodiments, system 100 includes a color wheel whose rotation is synchronized with the application of the spatial patterns to the light modulation unit. As it rotates, the color wheel cyclically applies a number of optical bandpass filters to the modulated light stream MLS. Each bandpass filter restricts the modulated light stream to a corresponding sub-band of wavelengths. Thus, the samples captured by the ADC 140 will include samples of intensity in each of the sub-bands. The samples may be de-multiplexed to form separate sub-band sequences. Each sub-band sequence may be processed to generate a corresponding sub-band image. (As an example, the color wheel may include a red-pass filter, a green-pass filter and a blue-pass filter to support color imaging.)

In some embodiments, the system 100 may include a memory (or a set of memories of one or more kinds).

Figure 2B:
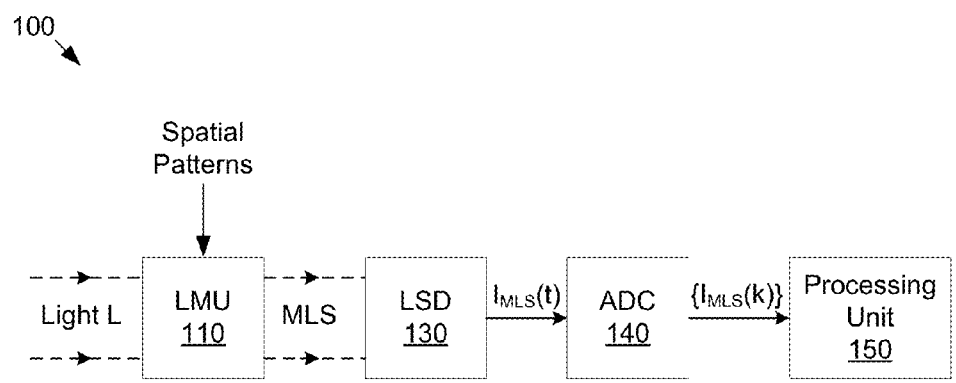
FIG. 2B illustrates an embodiment of system 100 that includes a processing unit 150.

In some embodiments, system 100 may include a processing unit 150, e.g., as shown in FIG. 2B. The processing unit 150 may be a digital circuit or a combination of digital circuits. For example, the processing unit may be a microprocessor (or system of interconnected of microprocessors), a programmable hardware element such as a field-programmable gate array (FPGA), an application specific integrated circuit (ASIC), or any combination such elements. The processing unit 150 may be configured to perform one or more functions such as image/video construction, system control, user interface, statistical analysis, and one or more inferences tasks.

The system 100 (e.g., the processing unit 150) may store the samples $\{I_{MLS}(k)\}$ in a memory, e.g., a memory resident in the system 100 or in some other system.

In one embodiment, processing unit 150 is configured to operate on the samples $\{I_{MLS}(k)\}$ to generate the image or video sequence. In this embodiment, the processing unit 150 may include a microprocessor configured to execute software (i.e., program instructions), especially software for performing an image/video construction algorithm. In one embodiment, system 100 is configured to transmit the compensated samples to some other system through a communication channel. (In embodiments where the spatial patterns are randomly-generated, system 100 may also transmit the random seed(s) used to generate the spatial patterns.) That other system may operate on the samples to construct the image/video. System 100 may have one or more interfaces configured for sending (and perhaps also receiving) data through one or more communication channels, e.g., channels such as wireless channels, wired channels, fiber optic channels, acoustic channels, laser-based channels, etc.

In some embodiments, processing unit 150 is configured to use any of a variety of algorithms and/or any of a variety of transformations to perform image/video construction. System 100 may allow a user to choose a desired algorithm and/or a desired transformation for performing the image/video construction.

In some embodiments, the system 100 is configured to acquire a set $Z_M$ of samples from the ADC 140 so that the sample set $Z_M$ corresponds to M of the spatial patterns applied to the light modulation unit 110, where M is a positive integer. The number M is selected so that the sample set $Z_M$ is useable to construct an n-pixel image or n-voxel video sequence that represents the incident light stream, where n is a positive integer less than or equal to the number N of light modulating elements in the light modulation unit 110. System 100 may be configured so that the number M is smaller than n. Thus, system 100 may operate as a compressive sensing device. (The number of "voxels" in a video sequence is the number of images in the video sequence times the number of pixels per image, or equivalently, the sum of the pixel counts of the images in the video sequence.)

In various embodiments, the compression ratio M/n may take any of a wide variety of values. For example, in different sets of embodiments, M/n may be, respectively, in the range [0.9,0.8], in the range [0.8,0.7], in the range [0.7,0.6], in the range [0.6,0.5], in the range [0.5,0.4], in the range [0.4,0.3], in the range [0.3,0.2], in the range [0.2,0.1], in the range [0.1, 0.05], in the range [0.05,0.01], in the range [0.001,0.01].

As noted above, the image constructed from the sample subset $Z_M$ may be an n-pixel image with n≤N. The spatial patterns may be designed to support a value of n less than N, e.g., by forcing the array of light modulating elements to operate at a lower effective resolution than the physical resolution N. For example, the spatial patterns may be designed to force each 2×2 cell of light modulating elements to act in unison. At any given time, the modulation state of the four elements in a 2×2 cell will agree. Thus, the effective resolution of the array of light modulating elements is reduced to N/4. This principle generalizes to any cell size, to cells of any shape, and to collections of cells with non-uniform cell size and/or cell shape. For example, a collection of cells of size $k_H \times k_v$, where $k_H$ and $k_v$ are positive integers, would give an effective resolution equal to $N/(k_H k_v)$. In one alternative embodiment, cells near the center of the array may have smaller sizes than cells near the periphery of the array.

Another way the spatial patterns may be arranged to support the construction of an n-pixel image with n less than N is to allow the spatial patterns to vary only within a subset of the array of light modulating elements. In this mode of operation, the spatial patterns are null (take the value zero) outside the subset. (Control unit 120 may be configured to implement this restriction of the spatial patterns.) Thus, light modulating elements corresponding to positions outside of the subset do not send any light (or send only the minimum amount of light attainable) to the light sensing device. Thus, the constructed image is restricted to the subset. In some embodiments, each spatial pattern (e.g., of a measurement pattern sequence) may be multiplied element-wise by a binary mask that takes the one value only in the allowed subset, and the resulting product pattern may be supplied to the light modulation unit. In some embodiments, the subset is a contiguous region of the array of light modulating elements, e.g., a rectangle or a circular disk or a hexagon. In some embodiments, the size and/or position of the region may vary (e.g., dynamically). The position of the region may vary in order to track a moving object. The size of the region may vary to dynamically control the rate of image acquisition.

In one embodiment, system 100 may include a light transmitter configured to generate a light beam (e.g., a laser beam), to modulate the light beam with a data signal and to transmit the modulated light beam into space or onto an optical fiber. System 100 may also include a light receiver configured to receive a modulated light beam from space or from an optical fiber, and to recover a data stream from the received modulated light beam.

In one embodiment, system 100 may be configured as a low-cost sensor system having minimal processing resources, e.g., processing resources insufficient to perform image (or video) construction in user-acceptable time. In this embodiment, the system 100 may store and/or transmit the samples $\{I_{MLS}(k)\}$ so that another agent, more plentifully endowed with processing resources, may perform the image/video construction based on the samples.

Figure 2C:
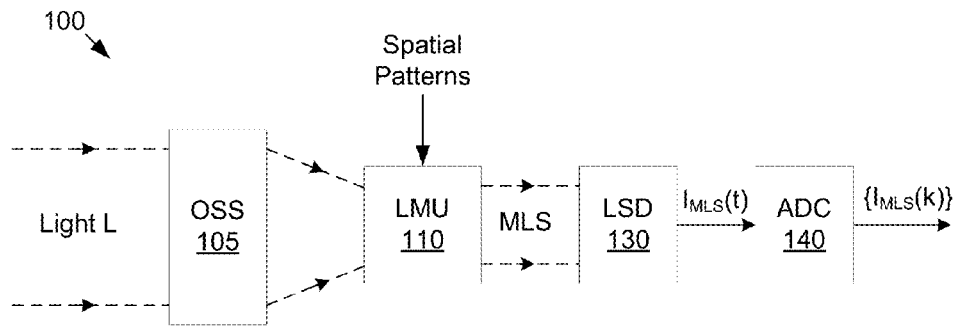
FIG. 2C illustrates an embodiment of system 100 that includes an optical subsystem 105 to focus received light L onto the light modulation unit 110.
Figure 2D:
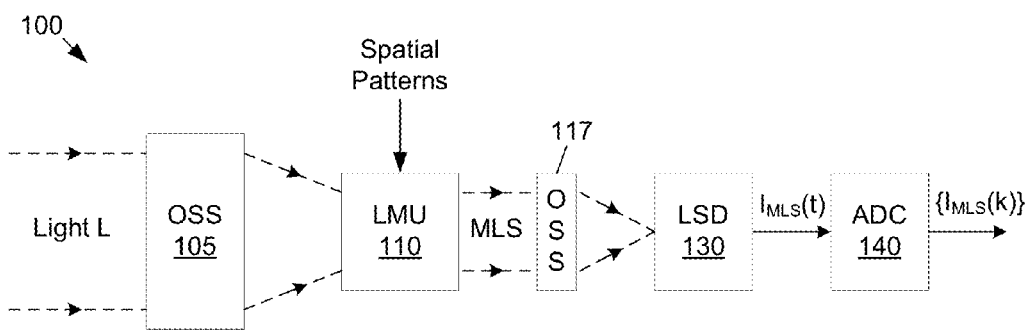
FIG. 2D illustrates an embodiment of system 100 that includes an optical subsystem 117 to direct or focus or concentrate the modulated light stream MLS onto the light sensing device 130.

In some embodiments, system 100 may include an optical subsystem 105 that is configured to modify or condition the light stream L before it arrives at the light modulation unit 110, e.g., as shown in FIG. 2C. For example, the optical subsystem 105 may be configured to receive the light stream L from the environment and to focus the light stream onto a modulating plane of the light modulation unit 110. The optical subsystem 105 may include a camera lens (or a set of lenses). The lens (or set of lenses) may be adjustable to accommodate a range of distances to external objects being imaged/sensed/captured.

In some embodiments, system 100 may include an optical subsystem 117 to direct the modulated light stream MLS onto a light sensing surface (or surfaces) of the light sensing device 130.

In some embodiments, the optical subsystem 117 may include one or more lenses, and/or, one or more mirrors.

In some embodiments, the optical subsystem 117 is configured to focus the modulated light stream onto the light sensing surface (or surfaces). The term "focus" implies an attempt to achieve the condition that rays (photons) diverging from a point on an object plane converge to a point (or an acceptably small spot) on an image plane. The term "focus" also typically implies continuity between the object plane point and the image plane point (or image plane spot)—points close together on the object plane map respectively to points (or spots) close together on the image plane. In at least some of the system embodiments that include an array of light sensing elements, it may be desirable for the modulated light stream MLS to be focused onto the light sensing array so that there is continuity between points on the light modulation unit LMU and points (or spots) on the light sensing array.

In some embodiments, the optical subsystem 117 may be configured to direct the modulated light stream MLS onto the light sensing surface (or surfaces) of the light sensing device 130 in a non-focusing fashion. For example, in a system embodiment that includes only one photodiode, it may not be so important to achieve the "in focus" condition at the light sensing surface of the photodiode since positional information of photons arriving at that light sensing surface will be immediately lost.

In one embodiment, the optical subsystem 117 may be configured to receive the modulated light stream and to concentrate the modulated light stream into an area (e.g., a small area) on a light sensing surface of the light sensing device 130. Thus, the diameter of the modulated light stream may be reduced (possibly, radically reduced) in its transit from the optical subsystem 117 to the light sensing surface (or surfaces) of the light sensing device 130. For example, in some embodiments, the diameter may be reduced by a factor of more than 1.5 to 1. In other embodiments, the diameter may be reduced by a factor of more than 2 to 1. In yet other embodiments, the diameter may be reduced by a factor of more than 10 to 1. In yet other embodiments, the diameter may be reduced by factor of more than 100 to 1. In yet other embodiments, the diameter may be reduced by factor of more than 400 to 1. In one embodiment, the diameter is reduced so that the modulated light stream is concentrated onto the light sensing surface of a single light sensing element (e.g., a single photodiode).

In some embodiments, this feature of concentrating the modulated light stream onto the light sensing surface (or surfaces) of the light sensing device allows the light sensing device to sense, at any given time, the sum (or surface integral) of the intensities of the modulated light portions within the modulated light stream. (Each time slice of the modulated light stream comprises a spatial ensemble of modulated light portions due to the modulation unit's action of applying the corresponding spatial pattern to the light stream.)

In some embodiments, the modulated light stream MLS may be directed onto the light sensing surface of the light sensing device 130 without concentration, i.e., without decrease in diameter of the modulated light stream, e.g., by use of photodiode having a large light sensing surface, large enough to contain the cross section of the modulated light stream without the modulated light stream being concentrated.

Figure 2E:
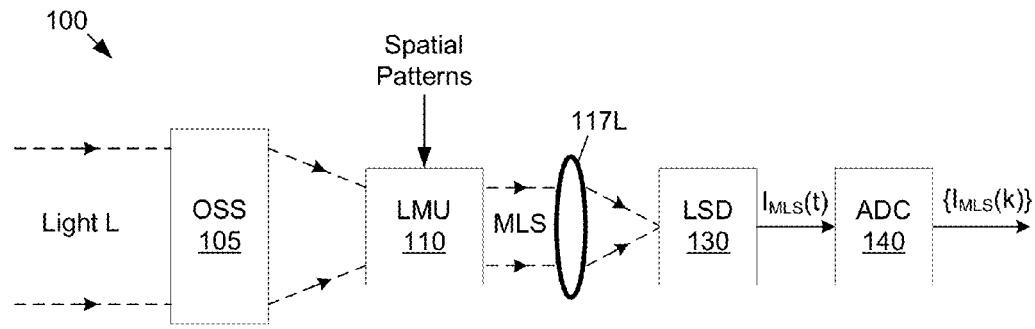
FIG. 2E illustrates an embodiment where the optical subsystem 117 is realized by a lens 117L.

In some embodiments, the optical subsystem 117 may include one or more lenses. FIG. 2E shows an embodiment where optical subsystem 117 is realized by a lens 117L, e.g., a biconvex lens or a condenser lens.

In some embodiments, the optical subsystem 117 may include one or more mirrors. In one embodiment, the optical subsystem 117 includes a parabolic mirror (or spherical mirror) to concentrate the modulated light stream onto a neighborhood (e.g., a small neighborhood) of the parabolic focal point. In this embodiment, the light sensing surface of the light sensing device may be positioned at the focal point.

In some embodiments, system 100 may include an optical mechanism (e.g., an optical mechanism including one or more prisms and/or one or more diffraction gratings) for splitting or separating the modulated light stream MLS into two or more separate streams (perhaps numerous streams), where each of the streams is confined to a different wavelength range. The separate streams may each be sensed by a separate light sensing device. (In some embodiments, the number of wavelength ranges may be, e.g., greater than 8, or greater than 16, or greater than 64, or greater than 256, or greater than 1024.) Furthermore, each separate stream may be directed (e.g., focused or concentrated) onto the corresponding light sensing device as described above in connection with optical subsystem 117. The samples captured from each light sensing device may be used to construct a corresponding image for the corresponding wavelength range. In one embodiment, the modulated light stream is separated into red, green and blue streams to support color (R,G,B) measurements. In another embodiment, the modulated light stream may be separated into IR, red, green, blue and UV streams to support five-channel multi-spectral imaging: (IR, R, G, B, UV). In some embodiments, the modulated light stream may be separated into a number of sub-bands (e.g., adjacent sub-bands) within the IR band to support multi-spectral or hyper-spectral IR imaging. In some embodiments, the number of IR sub-bands may be, e.g., greater than 8, or greater than 16, or greater than 64, or greater than 256, or greater than 1024. In some embodiments, the modulated light stream may experience two or more stages of spectral separation. For example, in a first stage the modulated light stream may be separated into an IR stream confined to the IR band and one or more additional streams confined to other bands. In a second stage, the IR stream may be separated into a number of sub-bands (e.g., numerous sub-bands) (e.g., adjacent sub-bands) within the IR band to support multispectral or hyper-spectral IR imaging.

In some embodiments, system 100 may include an optical mechanism (e.g., a mechanism including one or more beam splitters) for splitting or separating the modulated light stream MLS into two or more separate streams, e.g., where each of the streams have the same (or approximately the same) spectral characteristics or wavelength range. The separate streams may then pass through respective bandpass filters to obtain corresponding modified streams, wherein each modified stream is restricted to a corresponding band of wavelengths. Each of the modified streams may be sensed by a separate light sensing device. (In some embodiments, the number of wavelength bands may be, e.g., greater than 8, or greater than 16, or greater than 64, or greater than 256, or greater than 1024.) Furthermore, each of the modified streams may be directed (e.g., focused or concentrated) onto the corresponding light sensing device as described above in connection with optical subsystem 117. The samples captured from each light sensing device may be used to construct a corresponding image for the corresponding wavelength band. In one embodiment, the modulated light stream is separated into three streams which are then filtered, respectively, with a red-pass filter, a green-pass filter and a blue-pass filter. The resulting red, green and blue streams are then respectively detected by three light sensing devices to support color (R,G,B) acquisition. In another similar embodiment, five streams are generated, filtered with five respective filters, and then measured with five respective light sensing devices to support (IR, R, G, B, UV) multi-spectral acquisition. In yet another embodiment, the modulated light stream of a given band may be separated into a number of (e.g., numerous) sub-bands to support multi-spectral or hyper-spectral imaging.

In some embodiments, system 100 may include an optical mechanism for splitting or separating the modulated light stream MLS into two or more separate streams. The separate streams may be directed to (e.g., concentrated onto) respective light sensing devices. The light sensing devices may be configured to be sensitive in different wavelength ranges, e.g., by virtue of their different material properties. Samples captured from each light sensing device may be used to construct a corresponding image for the corresponding wavelength range.

Figure 2F:
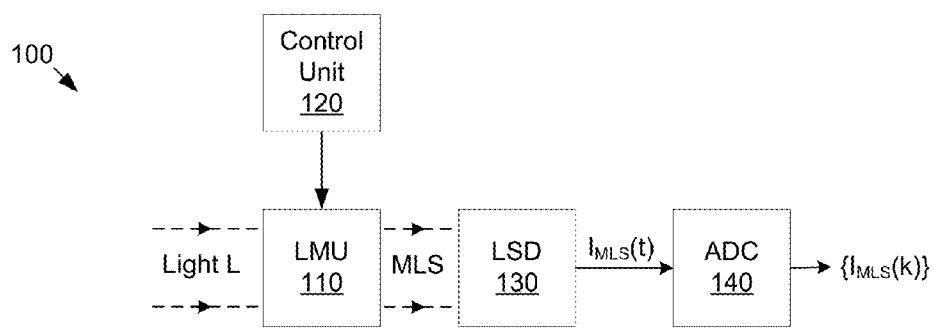
FIG. 2F illustrates an embodiment of system 100 that includes a control unit that is configured to supply a series of spatial patterns to the light modulation unit 110.

In some embodiments, system 100 may include a control unit 120 configured to supply the spatial patterns to the light modulation unit 110, as shown in FIG. 2F. The control unit may itself generate the patterns or may receive the patterns from some other agent. The control unit 120 and the light sensing device 130 may be controlled by a common clock signal so that the light sensing device 130 can coordinate (synchronize) its action of capturing the samples $\{I_{MLS}(k)\}$ with the control unit's action of supplying spatial patterns to the light modulation unit 110. (System 100 may include clock generation circuitry.)

In some embodiment, the control unit 120 may supply the spatial patterns to the light modulation unit in a periodic fashion.

The control unit 120 may be a digital circuit or a combination of digital circuits. For example, the control unit may include a microprocessor (or system of interconnected of microprocessors), a programmable hardware element such as a field-programmable gate array (FPGA), an application specific integrated circuit (ASIC), or any combination such elements.

In some embodiments, the control unit 120 may include a random number generator (RNG) or a set of random number generators to generate the spatial patterns or some subset of the spatial patterns.

In some embodiments, system 100 is battery powered. In some embodiments, the system 100 includes a set of one or more solar cells and associated circuitry to derive power from sunlight.

In some embodiments, system 100 includes its own light source for illuminating the environment or a target portion of the environment.

In some embodiments, system 100 may include a display (or an interface configured for coupling to a display) for displaying constructed images/videos.

In some embodiments, system 100 may include one or more input devices (and/or, one or more interfaces for input devices), e.g., any combination or subset of the following devices: a set of buttons and/or knobs, a keyboard, a keypad, a mouse, a touch-sensitive pad such as a trackpad, a touch-sensitive display screen, one or more microphones, one or more temperature sensors, one or more chemical sensors, one or more pressure sensors, one or more accelerometers, one or more orientation sensors (e.g., a three-axis gyroscopic sensor), one or more proximity sensors, one or more antennas, etc.

Regarding the spatial patterns that are used to modulate the light stream L, it should be understood that there are a wide variety of possibilities. In some embodiments, the control unit 120 may be programmable so that any desired set of spatial patterns may be used.

In some embodiments, the spatial patterns are binary valued. Such an embodiment may be used, e.g., when the light modulating elements are two-state devices. In some embodiments, the spatial patterns are n-state valued, where each element of each pattern takes one of n states, where n is an integer greater than two. (Such an embodiment may be used, e.g., when the light modulating elements are each able to achieve n or more modulation states). In some embodiments, the spatial patterns are real valued, e.g., when each of the light modulating elements admits a continuous range of modulation. (It is noted that even a two-state modulating element may be made to effectively apply a continuous range of modulation by duty cycling the two states during modulation intervals.)

The spatial patterns may belong to a set of measurement vectors that is incoherent with a set of vectors in which the image/video is approximately sparse ("the sparsity vector set"). (See "Sparse Signal Detection from Incoherent Projections", Proc. Int. Conf. Acoustics, Speech Signal Processing—ICASSP, May 2006, Duarte et al.) Given two sets of vectors A={$a_i$} and B={$b_i$} in the same N-dimensional space, A and B are said to be incoherent if their coherence measure $\mu(A,B)$ is sufficiently small. The coherence measure is defined as:

$$\mu(A, B) = \max_{i,j} |\langle a_i, b_j \rangle|.$$

The number of compressive sensing measurements (i.e., samples of the sequence $\{I_{MLS}(k)\}$ needed to construct an N-pixel image (or N-voxel video sequence) that accurately represents the scene being captured is a strictly increasing function of the coherence between the measurement vector set and the sparsity vector set. Thus, better compression can be achieved with smaller values of the coherence.

In some embodiments, the measurement vector set may be based on a code. Any of various codes from information theory may be used, e.g., codes such as exponentiated Kerdock codes, exponentiated Delsarte-Goethals codes, run-length limited codes, LDPC codes, Reed Solomon codes and Reed Muller codes.

In some embodiments, the measurement vector set corresponds to a permuted basis such as a permuted DCT basis or a permuted Walsh-Hadamard basis, etc.

In some embodiments, the spatial patterns may be random or pseudo-random patterns, e.g., generated according to a random number generation (RNG) algorithm using one or more seeds. In some embodiments, the elements of each pattern are generated by a series of Bernoulli trials, where each trial has a probability p of giving the value one and probability 1−p of giving the value zero. (For example, in one embodiment p=½.) In some embodiments, the elements of each pattern are generated by a series of draws from a Gaussian random variable.)

The system 100 may be configured to operate in a compressive fashion, where the number of the samples $\{I_{MLS}(k)\}$ captured by the system 100 is less than (e.g., much less than) the number of pixels in the image (or video) to be constructed from the samples. In many applications, this compressive realization is very desirable because it saves on power consumption, memory utilization and transmission bandwidth consumption. However, non-compressive realizations are contemplated as well.

In some embodiments, the system 100 is configured as a camera or imager that captures information representing an image (or a series of images) from the external environment, e.g., an image (or a series of images) of some external object or scene. The camera system may take different forms in different applications domains, e.g., domains such as visible light photography, infrared photography, ultraviolet photography, high-speed photography, low-light photography, underwater photography, multi-spectral imaging, hyperspectral imaging, etc. In some embodiments, system 100 is configured to operate in conjunction with (or as part of) another system, e.g., in conjunction with (or as part of) a microscope, a telescope, a robot, a security system, a surveillance system, a fire sensor, a node in a distributed sensor network, etc.

In some embodiments, system 100 is configured as a spectrometer.

In some embodiments, system 100 is configured as a multi-spectral or hyper-spectral imager.

In some embodiments, system 100 may also be configured to operate as a projector. Thus, system 100 may include a light source, e.g., a light source located at or near a focal point of optical subsystem 117. In projection mode, the light modulation unit 110 may be supplied with an image (or a video sequence) so that the image (or video sequence) can be displayed on a display surface (e.g., screen).

In some embodiments, system 100 includes an interface for communicating with a host computer. The host computer may send control information and/or program code to the system 100 via the interface. Furthermore, the host computer may receive status information and/or compressive sensing measurements from system 100 via the interface.

Figure 3A:
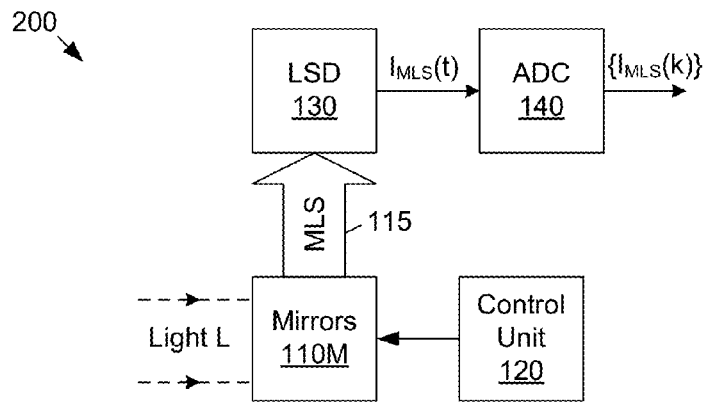
FIG. 3A illustrates system 200, where the light modulation unit 110 is realized by a plurality of mirrors (collectively referenced by label 110M).

In one realization 200 of system 100, the light modulation unit 110 may be realized by a plurality of mirrors, e.g., as shown in FIG. 3A. (The mirrors are collectively indicated by the label 110M.) The mirrors 110M are configured to receive corresponding portions of the light L received from the environment, albeit not necessarily directly from the environment. (There may be one or more optical elements, e.g., one or more lenses along the input path to the mirrors 110M.) Each of the mirrors is configured to controllably switch between two orientation states. In addition, each of the mirrors is configured to (a) reflect the corresponding portion of the light onto a sensing path 115 when the mirror is in a first of the two orientation states and (b) reflect the corresponding portion of the light away from the sensing path when the mirror is in a second of the two orientation states.

In some embodiments, the mirrors 110M are arranged in an array, e.g., a two-dimensional array or a one-dimensional array. Any of various array geometries are contemplated. For example, in different embodiments, the array may be a square array, a rectangular array, a hexagonal array, etc. In some embodiments, the mirrors are arranged in a spatially-random fashion.

The mirrors 110M may be part of a digital micromirror device (DMD). For example, in some embodiments, one of the DMDs manufactured by Texas Instruments may be used.

The control unit 120 may be configured to drive the orientation states of the mirrors through the series of spatial patterns, where each of the patterns of the series specifies an orientation state for each of the mirrors.

The light sensing device 130 may be configured to receive the light portions reflected at any given time onto the sensing path 115 by the subset of mirrors in the first orientation state and to generate an analog electrical signal representing $I_{MLS}$(t) representing a cumulative intensity of the received light portions as function of time. As the mirrors are driven through the series of spatial patterns, the subset of mirrors in the first orientation state will vary from one spatial pattern to the next. Thus, the cumulative intensity of light portions reflected onto the sensing path 115 and arriving at the light sensing device will vary as a function time. Note that the term "cumulative" is meant to suggest a summation (spatial integration) over the light portions arriving at the light sensing device at any given time. This summation may be implemented, at least in part, optically (e.g., by means of a lens and/or mirror that concentrates or focuses the light portions onto a concentrated area as described above).

Figure 3B:
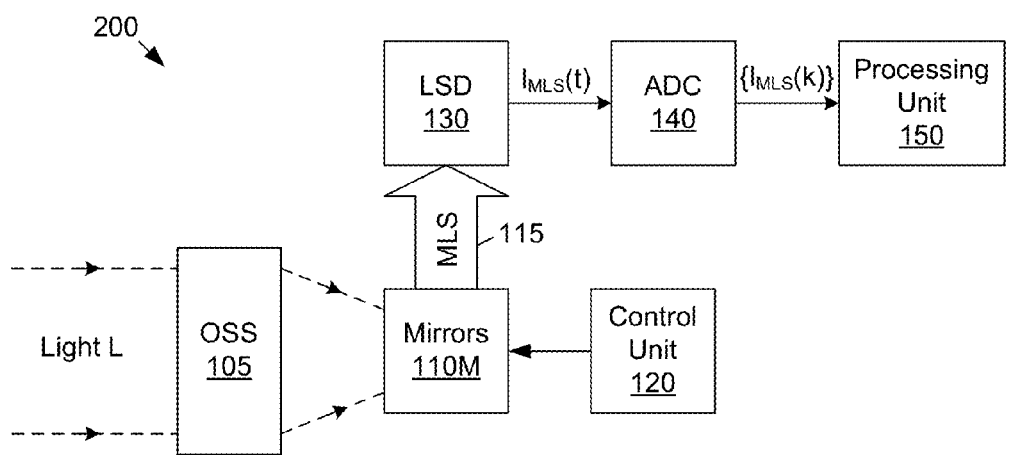
FIG. 3B shows an embodiment of system 200 that includes the processing unit 150.

System realization 200 may include any subset of the features, embodiments and elements discussed above with respect to system 100. For example, system realization 200 may include the optical subsystem 105 to operate on the incoming light L before it arrives at the mirrors 110M, e.g., as shown in FIG. 3B.

Figure 4:
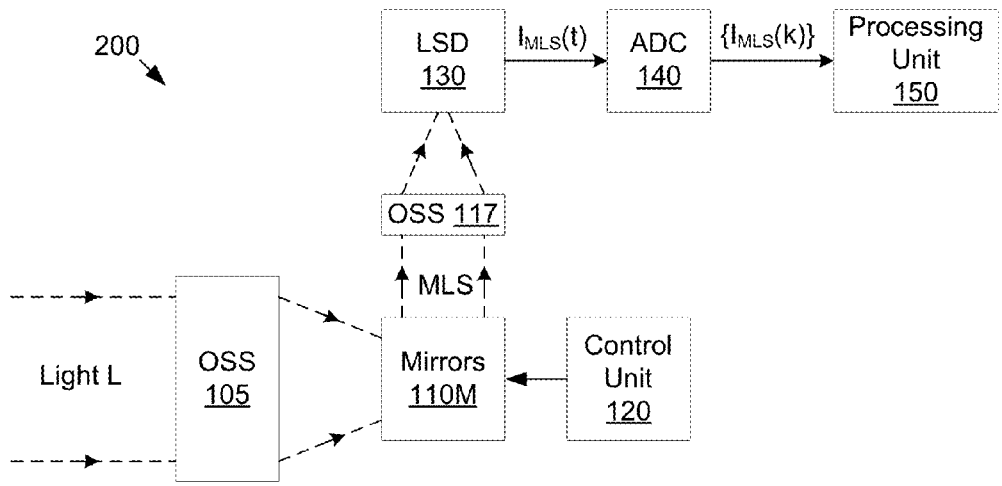
FIG. 4 shows an embodiment of system 200 that includes the optical subsystem 117 to direct or focus or concentrate the modulated light stream MLS onto the light sensing device 130.
Figure 5A:
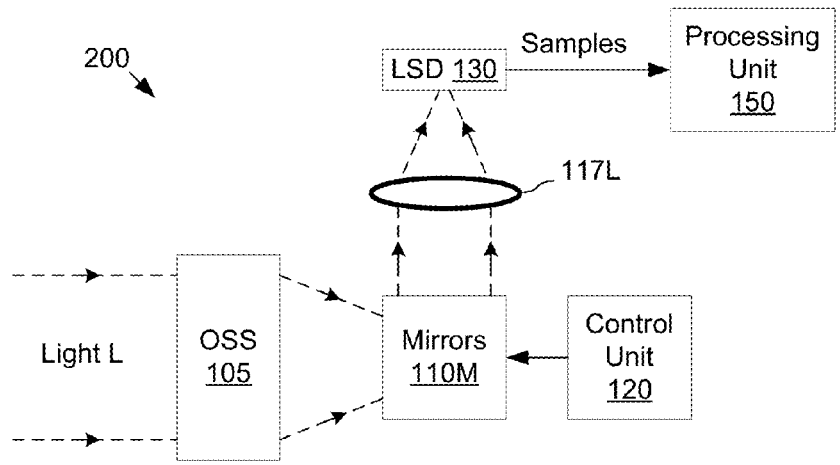
FIG. 5A shows an embodiment of system 200 where the optical subsystem 117 is realized by the lens 117L.

In some embodiments, system realization 200 may include the optical subsystem 117 along the sensing path as shown in FIG. 4. The optical subsystem 117 receives the light portions reflected onto the sensing path 115 and directs (e.g., focuses or concentrates) the received light portions onto a light sensing surface (or surfaces) of the light sensing device 130. In one embodiment, the optical subsystem 117 may include a lens 117L, e.g., as shown in FIG. 5A.

Figure 5B:
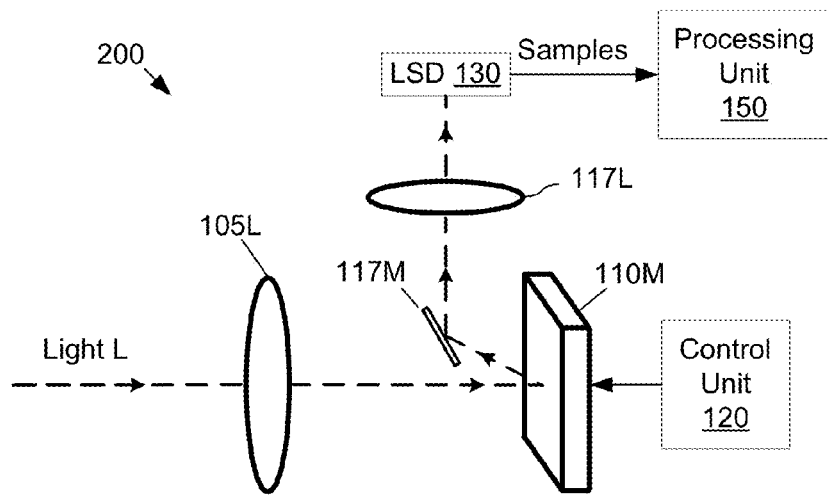
FIG. 5B shows an embodiment of system 200 where the optical subsystem 117 is realized by a mirror 117M and lens 117L in series.

In some embodiments, the optical subsystem 117 may include one or more mirrors, e.g., a mirror 117M as shown in FIG. 5B. Thus, the sensing path may be a bent path having more than one segment. FIG. 5B also shows one possible embodiment of optical subsystem 105, as a lens 105L.

Figure 5C:
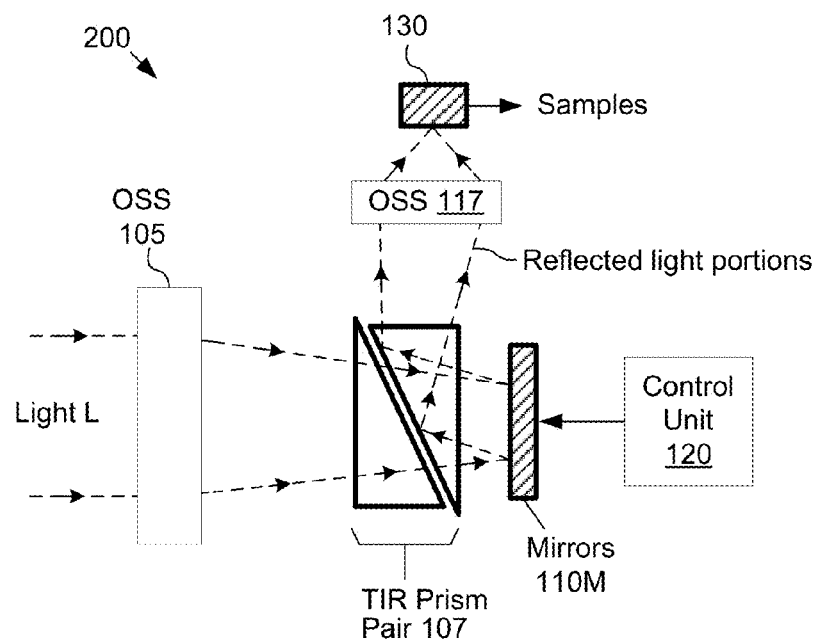
FIG. 5C shows another embodiment of system 200 that includes a TIR prism pair 107.

In some embodiments, there may be one or more optical elements intervening between the optical subsystem 105 and the mirrors 110M. For example, as shown in FIG. 5C, a TIR prism pair 107 may be positioned between the optical subsystem 105 and the mirrors 110M. (TIR is an acronym for "total internal reflection".) Light from optical subsystem 105 is transmitted through the TIR prism pair and then interacts with the mirrors 110M. After having interacted with the mirrors 110M, light portions from mirrors in the first orientation state are reflected by a second prism of the pair onto the sensing path 115. Light portions from mirrors in the second orientation state may be reflected away from the sensing path.

Optimizing Dynamic Range in Compressive Imaging Measurements

Figure 6:
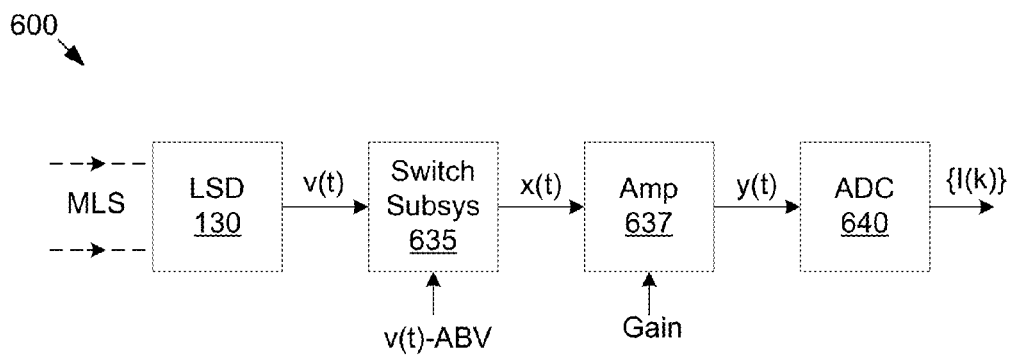
FIG. 6 illustrates one embodiment of a system 600 configured to controllably couple either a detector voltage or a difference between the detector voltage and an adjustable baseline voltage to the input of an amplifier 637.

In one set of embodiments, a system 600 may be configured as shown in FIG. 6. The system 600 may include the light sensing device 130 as variously described above, and may also include switching subsystem 635, amplifier 637 and analog-to-digital converter 640.

The light sensing device 130 is configured to receive a modulated light stream MLS and to generate an electrical signal v(t) that represents intensity of the modulated light stream as a function of time, e.g., as variously described above. The modulated light stream is produced by modulating an incident stream of light with a sequence of spatial patterns, e.g., as variously described above.

The amplifier 637 is configured to amplify an input signal x(t) in order to obtain an amplified signal y(t). The gain of the amplifier is controllable so that different gains may be applied at different times.

The analog-to-digital converter (ADC) 640 is configured to sample the amplified signal y(t) in order to obtain a sequence of samples {I(k)}. System 600 and/or ADC 640 may be configured to: (a) acquire the samples so that they are restricted to the steady state portions of the pattern modulation periods (to avoid the transients that occur at transitions between spatial patterns, and/or, (b) capture two or more samples per spatial pattern and average the two or more samples per spatial pattern to reduce noise in the samples. For more, information on features (a) and (b), please see U.S. application Ser. No. 13/207,258, filed on Aug. 10, 2011, entitled "Techniques for Removing Noise in a Compressive Imaging Device", invented by Gary L. Woods and James M. Tidman, which is hereby incorporated by reference in its entirety as though fully and completely set forth herein.

The switching subsystem 635 is configured to controllably select one of the following to be the input signal to the amplifier: (a) the electrical signal v(t) from the light sensing device, or (b) a difference signal representing a difference between the electrical signal v(t) and an adjustable baseline voltage (ABV). The switching subsystem 635 may be implemented in any of various ways known in the art of electrical engineering. The switching subsystem may be configured to pass the selected signal with minimal distortion. The switching subsystem may be a semiconductor-based switch.

In some embodiments, system 600 is configured to store a set $Z_M$ of the samples $\{I(k)\}$, where the set $Z_M$ corresponds to M of the spatial patterns (M measurement patterns) and is captured while the difference signal is selected as the input to the amplifier 637. The value M is selected so that the sample set $Z_M$ is usable to construct an N-pixel image representing the incident light stream, where N is the number of light modulating elements (in the light modulation unit) used to modulate the incident light stream, where M is smaller than N. Thus, system 600 may be interpreted as a compressive sensing device, which obtains compressed representations of images from the incident light stream.

The compression ratio M/N may take different values in different embodiments, or in different imaging contexts, or in different noise environments. In different sets of embodiments, the compression ratio M/N may be, respectively, in the range [0.9,0.8], in the range [0.8,0.7], in the range [0.7,0.6], in the range [0.6,0.5], in the range [0.5,0.4], in the range [0.4, 0.3], in the range [0.3,0.2], in the range [0.2,0.1], in the range [0.1,0.05], in the range [0.05,0.01]. In some embodiments, the compression ratio may be a user-controllable parameter, e.g., determined by input received through a user interface.

Figure 7:
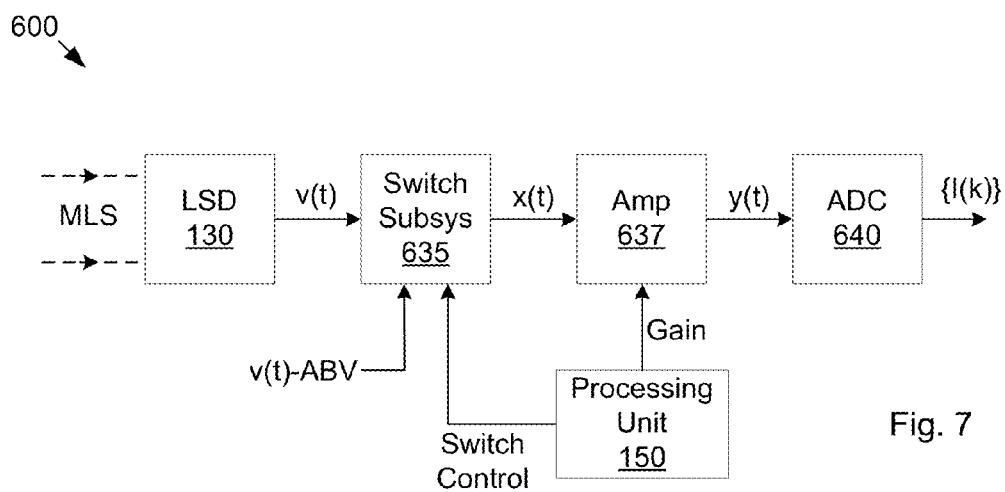
FIG. 7 illustrates an embodiment of a system 600 where processing unit 150 controls the state of the switching subsystem.

In some embodiments, the system 600 also includes the processing unit 150 as described above. See FIG. 7. The processing unit is configured to control the state of the switching subsystem 635 and to control the gain of the amplifier 637. The processing unit may be configured to direct the switching subsystem to select the difference signal as the input signal to the amplifier, e.g., during an image acquisition mode. The adjustable baseline voltage ABV may be set so that it is approximately equal to an average value of the electrical signal v(t). Furthermore, the processing unit may set the gain of the amplifier based on an estimate of a standard deviation of the electrical signal v(t). For example, the gain may be set so that a predetermined scalar multiple of the standard deviation fills the input voltage range of the ADC (or some predetermined fraction of the input voltage range).

In some embodiments, the action of modulating the incident light stream is performed by a light modulation unit having N light modulating elements, e.g., by the light modulation 110 as described above. (See, e.g., FIGS. 2A and 2B.) When the spatial patterns applied to the light modulation unit are random or pseudo-random, the estimate of the standard deviation may be a scalar multiple of $1/\sqrt{N}$. For example, in one embodiment, the standard deviation may be estimated by: $SD=AVG/\sqrt{N}$, where AVG is the average value (DC value) of the electrical signal v(t).

Figure 8:
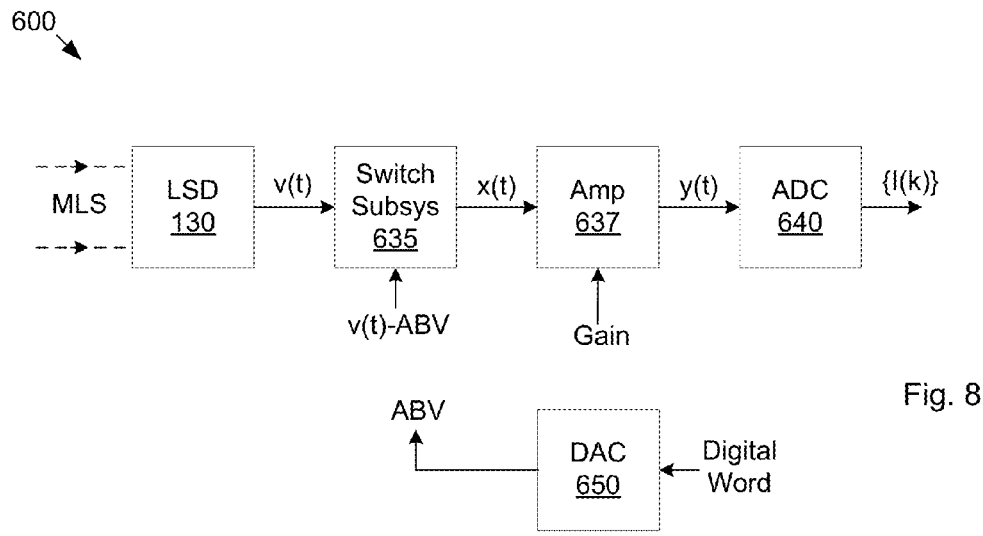
FIG. 8 illustrates an embodiment of a system 600 where a digital-to-analog converter (DAC) is used to generate the adjustable baseline voltage.
Figure 9:
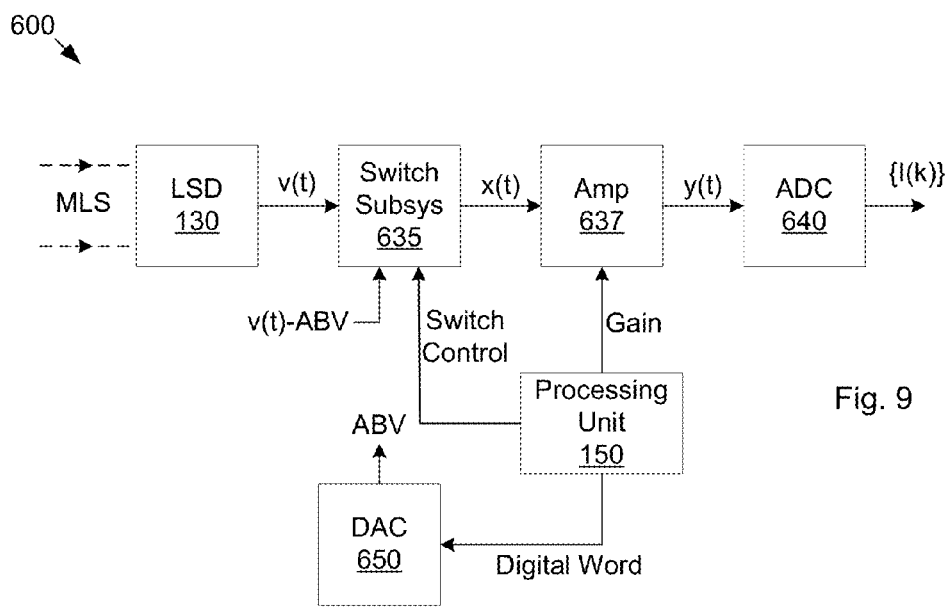
FIG. 9 illustrates an embodiment of a system 600 where the processing unit 150 supplies the digital input word used by the DAC and the gain used by the amplifier 637.

In some embodiments, system 600 may include a digital-to-analog converter (DAC) 650 configured to generate the adjustable baseline voltage based on a digital input word, e.g., as shown in FIG. 8. The processing unit 150 may be configured to set the digital input word of the DAC, e.g., as shown in FIG. 9. The processing unit may set the digital input word based on an estimate of an average value of the electrical signal v(t), so that the adjustable baseline voltage ABV is approximately equal to the average value estimate. In addition, the processing unit may be configured to: direct the switching subsystem 635 to select the difference signal v(t)−ABV as the input signal to the amplifier; and set the gain of the amplifier 637 based on the standard deviation of the electrical signal, e.g., so that a predetermined scalar multiple of the standard deviation fills the input voltage range of the ADC 640 (or some predetermined fraction of the input voltage range).

Figure 10:
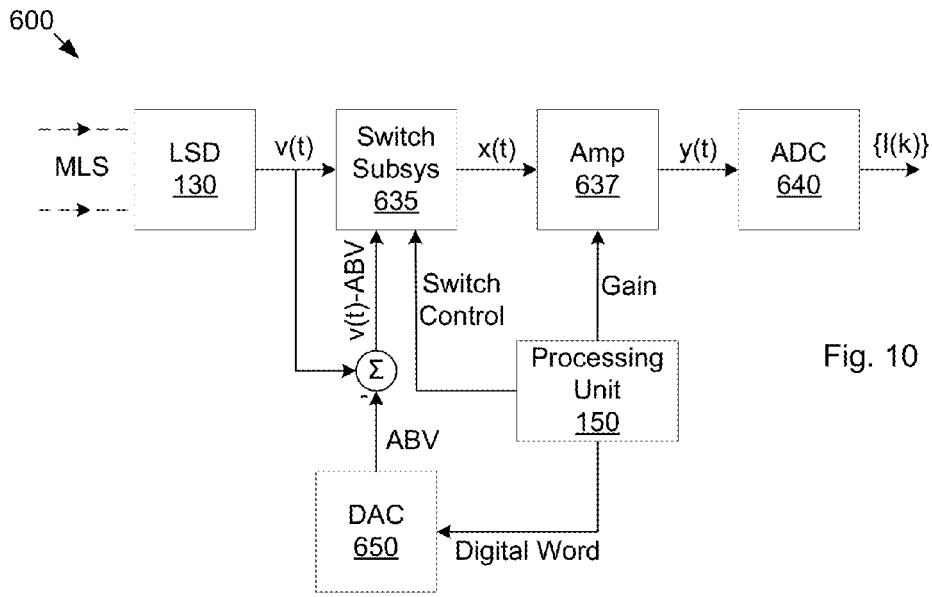
FIG. 10 illustrates an embodiment of a system 600 where the detector voltage and the adjustable baseline voltage are subtracted prior to the switching subsystem 635.

In some embodiments, system 600 may include a sum circuit E configured to determine the difference signal by summing the electrical signal v(t) and a negative of the adjustable baseline voltage ABV, e.g., as shown in FIG. 10.

Figure 11:
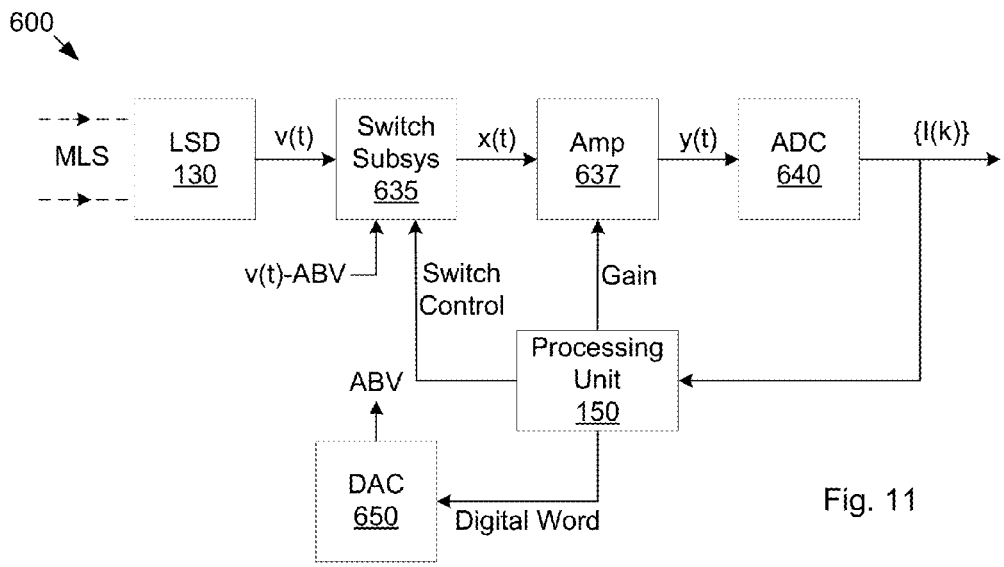
FIG. 11 illustrates an embodiment of a system 600 where processing unit 150 receives the samples acquired by the analog-to-digital (ADC) 640.

In some embodiments, system 600 may be configured to estimate the average of the electrical signal v(t), e.g., using the processing unit 150 as shown in FIG. 11. To enable the average value estimation, the processing unit may set a gain of the amplifier 637 to a value $G_A$ (e.g., a value that is at the low end of the gain control range of the amplifier 637), and direct the switching subsystem 635 to select the electrical signal v(t) as the input signal to the amplifier 637. Furthermore, processing unit 150 may determine the estimate for the average value of the electrical signal based on one or more of the samples of the sequence of samples $\{I(k)\}$. In one embodiment, the gain value $G_A$ is selected so that the output range of the light sensing device 130 (or the output range of an amplifier intervening between the light sensing device 130 and amplifier 637) corresponds to the input voltage range of the ADC 640.

In some embodiments, the one or more samples used to estimate the average value correspond to one or more calibration patterns included in the sequence of spatial patterns. The control unit 120 as described above may be configured to insert the calibration patterns into the sequence of spatial patterns. (See, e.g., FIG. 2F.)

In some embodiments, the one or more calibration patterns include a maximal light transfer pattern and a minimal light transfer pattern. The maximal light transfer pattern is a pattern that instructs all the light modulating elements of the light modulation unit 110 to take the maximum transfer state. The maximum transfer state of a light modulating element is the state in which the ratio of the intensity of the light portion outputted from the element (onto the path that leads to the light sensing device 130) to the intensity of the light portion incident upon the element is maximized, within the range of control supported by the element. (For example, for an element having controllable transmittance, such as an LCD shutter, the maximum transfer state is the state of maximum transparency. As another example, for a reflective element such as a micromirror in a DMD, the maximum transfer state is the orientation state that reflects the received light portion onto the light sensing path 115.) Similarly, the minimal light transfer pattern is a pattern that instructs all the light modulating elements of the light modulation unit to take the minimum transfer state. The minimum transfer state of a light modulating element is the state in which the ratio of the intensity of the light portion outputted from the element (onto the path that leads to the light sensing device 130) to the intensity of the light portion incident upon the element is minimized, within the range of control supported by the element. (For example, for an element having controllable transmittance, such as an LCD shutter, the minimum transfer state is the state of minimum transparency (maximum opacity). As another example, for a reflective element such as a micromirror in a DMD, the minimum transfer state is the orientation state that reflects the received light portion away from the light sensing path 115.)

The average value of electrical signal may be estimated as the average of $V_{MAX}$ and $V_{MIN}$, where $V_{MAX}$ is the amplitude of a sample corresponding to the maximal transfer pattern and $V_{MIN}$ is the amplitude of a sample corresponding to the minimal transfer pattern. In one embodiment, the system 600 may be configured to capture two or more samples corresponding the maximal transfer pattern, in which case, $V_{MAX}$ may be the average of the amplitudes of the two or more samples. Similarly, the system 600 may capture two or more samples corresponding to the minimal transfer pattern, in which case, $V_{MIN}$ may be the average of the amplitudes of those two or more samples.

In some embodiments, the one or more calibration patterns include at least one 50% transfer pattern. A 50% transfer pattern is a spatial pattern that is configured so that 50% of the power in the incident light stream passes on average into the modulated light stream. For example, a spatial pattern where half the light modulating elements are ON (maximum transfer) and the remaining half are OFF (minimum transfer) is a 50% transfer pattern.

In one embodiment, the average value of the electrical signal may be estimated based on one or more samples corresponding to a single 50% transfer pattern, e.g., based on an average of two or more samples captured during the assertion of the 50% transfer pattern. In another embodiment, the average value of the electrical signal may be estimated based on samples captured during the assertion of two or more 50% transfer patterns.

In some embodiments, the one or more calibration patterns include one or more checkerboard patterns. A checkerboard pattern is a pattern that is based on a tiling of the array of light modulating elements with a rectangular unit cell. The elements in each tile take the same modulation state (all ON or all OFF). The tiles immediately to the north, south, east and west of the arbitrary tile (relative to the axes of the array) take the opposite modulation state as the arbitrary tile. A maximum-resolution checkerboard pattern is one where the tiles are 1×1 tiles, each covering only a single element of the light modulating array. A checkerboard pattern of lower resolution uses tiles of size $k_x \times k_y$ where $k = k_x \times k_y$ is greater than one.

In some embodiments, the sequence of spatial patterns includes two or more calibration patterns, wherein the two or more calibration patterns are not all identical. For example, the calibration patterns may include a first checkerboard pattern and a second checkerboard pattern, where the first and second checkerboard patterns are complementary to each other: one takes the ON state where the other takes the OFF state, and vice versa.

Figure 12:
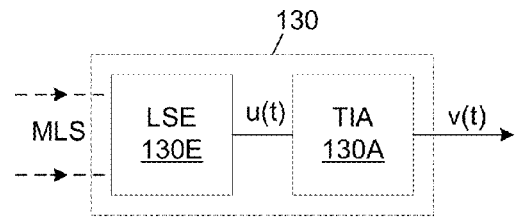
FIG. 12 illustrates an embodiment of light sensing device 130 that includes a transimpedance amplifier 130A.

In some embodiments, the light sensing device 130 includes light sensing element 130E and a transimpedance amplifier (TIA) 130A, e.g., as shown in FIG. 12. The light sensing element 130E generates an electrical signal u(t) that represent intensity of the modulated light stream MLS as a function of time. The transimpedance amplifier 130 amplifies the signal u(t) to produce the electrical signal v(t).

In some embodiments, the spatial patterns used to drive the light modulation unit include pseudo-random spatial patterns, e.g., as variously described above. Each pseudo-random spatial pattern may be viewed as a realization of a random process on the array of light modulating elements, where the modulation state of each light modulating element is determined by a corresponding random variable. The random variables over the array of light modulating elements may be independent and identically distributed, or approximately so. For example, each spatial pattern may be generated so that each element of the pattern has probability ½ of being ON and probability ½ of being OFF. (In other embodiments, the ON probability may be different from ½.) While the pseudo-random patterns are being applied to the incident light stream, the samples corresponding to the pseudo-random patterns may have a standard deviation $V_0/\sqrt{N}$, where $V_0$ is the mean value of the signal, where N is the number of light modulating elements in the light modulation unit 110.

Figure 13:
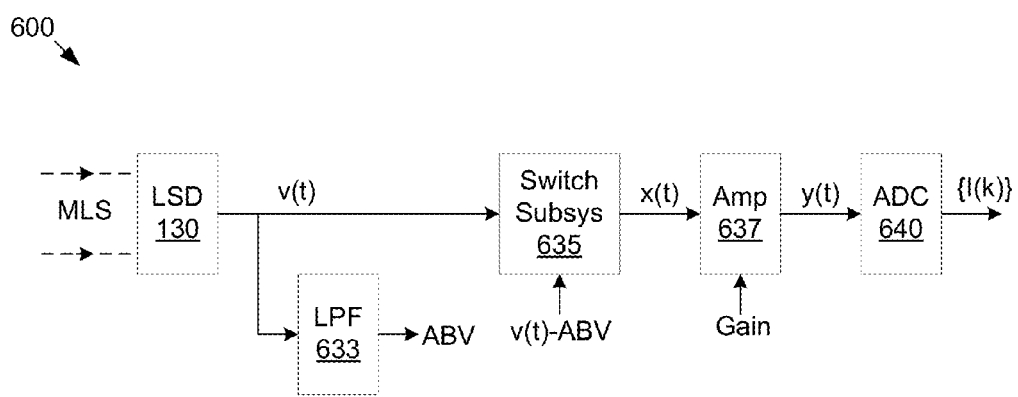
FIG. 13 illustrates an embodiment of a system 600 where a lowpass filter 633 is used to generate the adjustable baseline voltage.

In some embodiments, system 600 may include a lowpass filter 633, e.g., as shown in FIG. 13. The lowpass filter 633 is configured to low-pass filter the electrical signal v(t) in the analog domain in order to generate the adjustable baseline voltage ABV. In particular, the lowpass filter may be configured so that the adjustable baseline voltage corresponds to the average value (or DC component) of the electrical signal v(t). The lowpass filter may be implemented in any of a wide variety of ways known in the field of signal processing.

Figure 14:
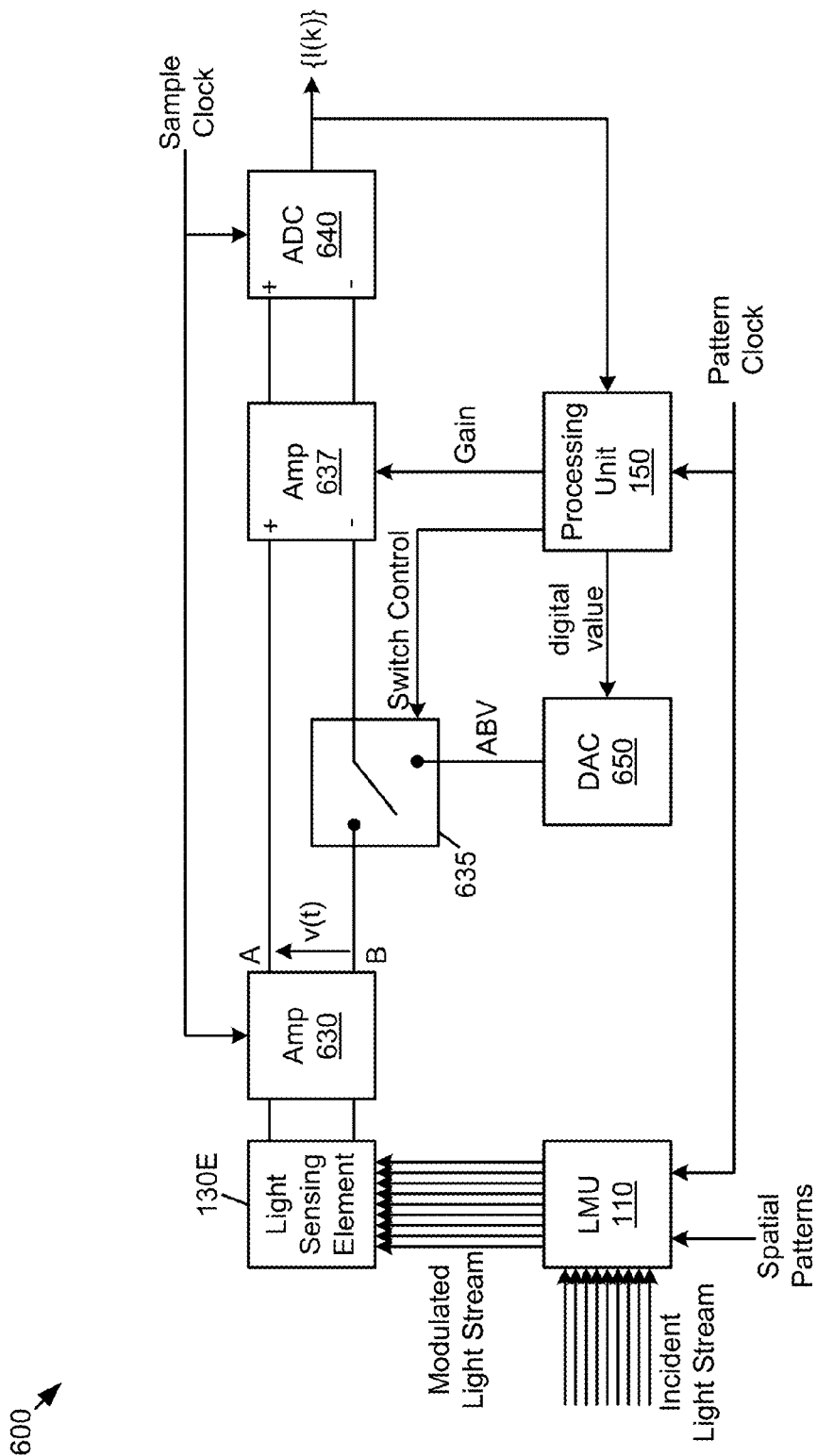
FIG. 14 illustrates an embodiment of a system 600 where the switch 635 couples the minus input of the amplifier 637 to either the terminal B of the amplifier 630 or to the output of the DAC.

In one embodiment, the system 600 may be configured as shown in FIG. 14. In addition to amplifier 637, the system of FIG. 14 includes an amplifier 630. (For example, the amplifier might be a transimpedance amplifier. In some embodiments, the amplifier includes one or more stages). The amplifier 630 generates the voltage signal v(t) that represents intensity of the modulated light stream as a function of time. The voltage v(t) appears across terminals A and B of the amplifier 630. The terminal A is coupled to the plus input of the amplifier 637. Switch 635 is configured to selectively connect the minus input of the amplifier 637 to either terminal B or to the adjustable baseline voltage ABV based on a control signal provided by processing unit 150. During an initial mode, processing unit 150 sets the gain to a relatively low value, directs the switch to couple to terminal B, acquires one or more samples of the resulting sample sequence {I(k)} (e.g., samples corresponding to one or more calibration patterns), and estimates the average of the signal v(t) based on the acquired samples. The processing unit may then compute a standard deviation of the signal v(t) based on the estimated average. In an image acquisition mode, the processing unit 150 sets the gain of the amplifier 637 to a value based on the computed standard deviation, sets the digital value of the DAC so that the adjustable baseline voltage ABV is approximately equal to the estimated average value, and directs the switch to couple to the ABV. The resulting sample sequence {I(k)} is a compressed representation of an image or video sequence carried by the incident light stream.

Figure 15:
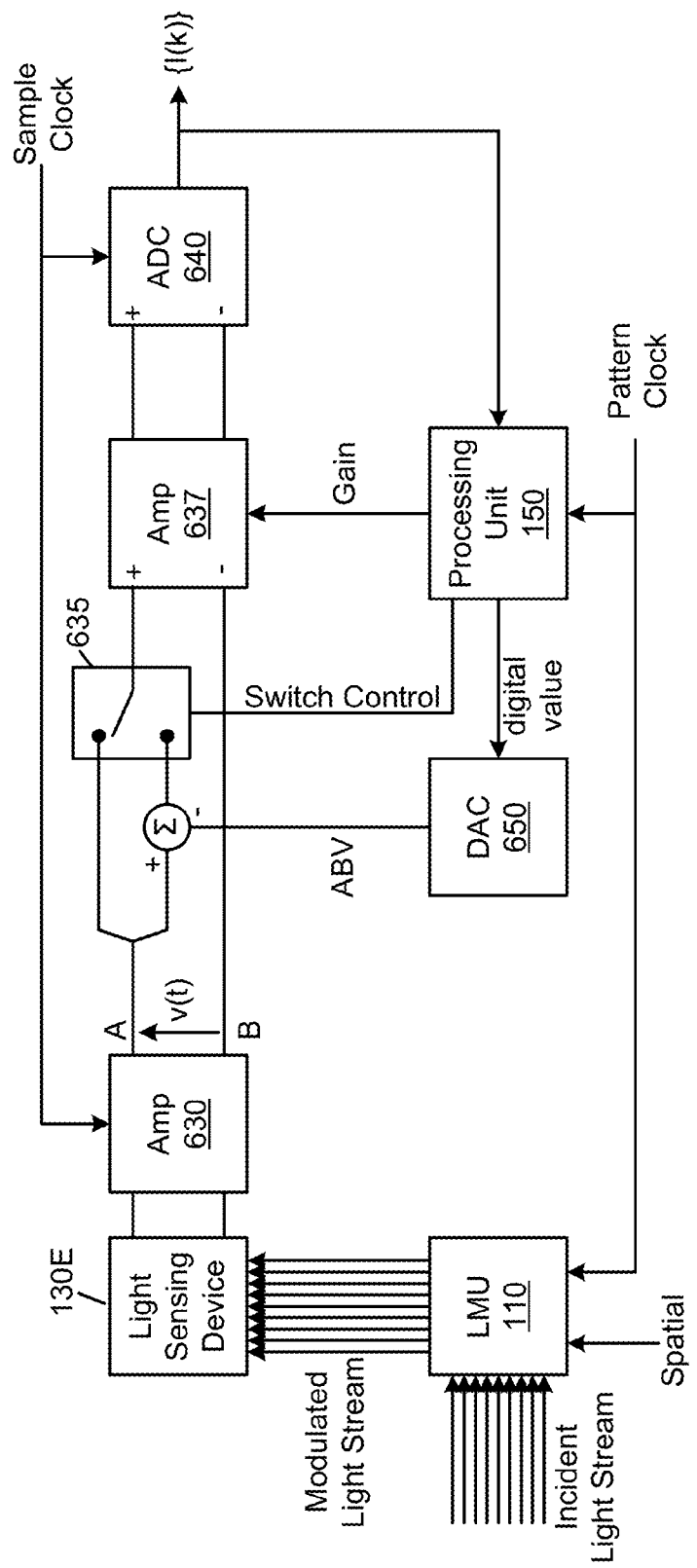
FIG. 15 illustrates an embodiment of a system 600 where the switch 635 couples the plus input of the amplifier 637 to either the terminal A of the amplifier 630 or to the output of the summing node.

In another embodiment, system 600 may be configured as shown in FIG. 15. The sum circuit Σ generates an output signal corresponding to the difference between v(t) and the adjustable baseline voltage ABV: v(t)−ABV. The terminal B is connected to the minus input of the amplifier 637. The switch 635 selectively couples the terminal A or the output of the sum circuit Σ to the plus input of the amplifier 637. In the initial mode, processing unit 150 directs the switch 635 to couple to terminal A. In the image acquisition mode, the processing unit directs the switch to couple to the output of the sum circuit.

Figure 16:
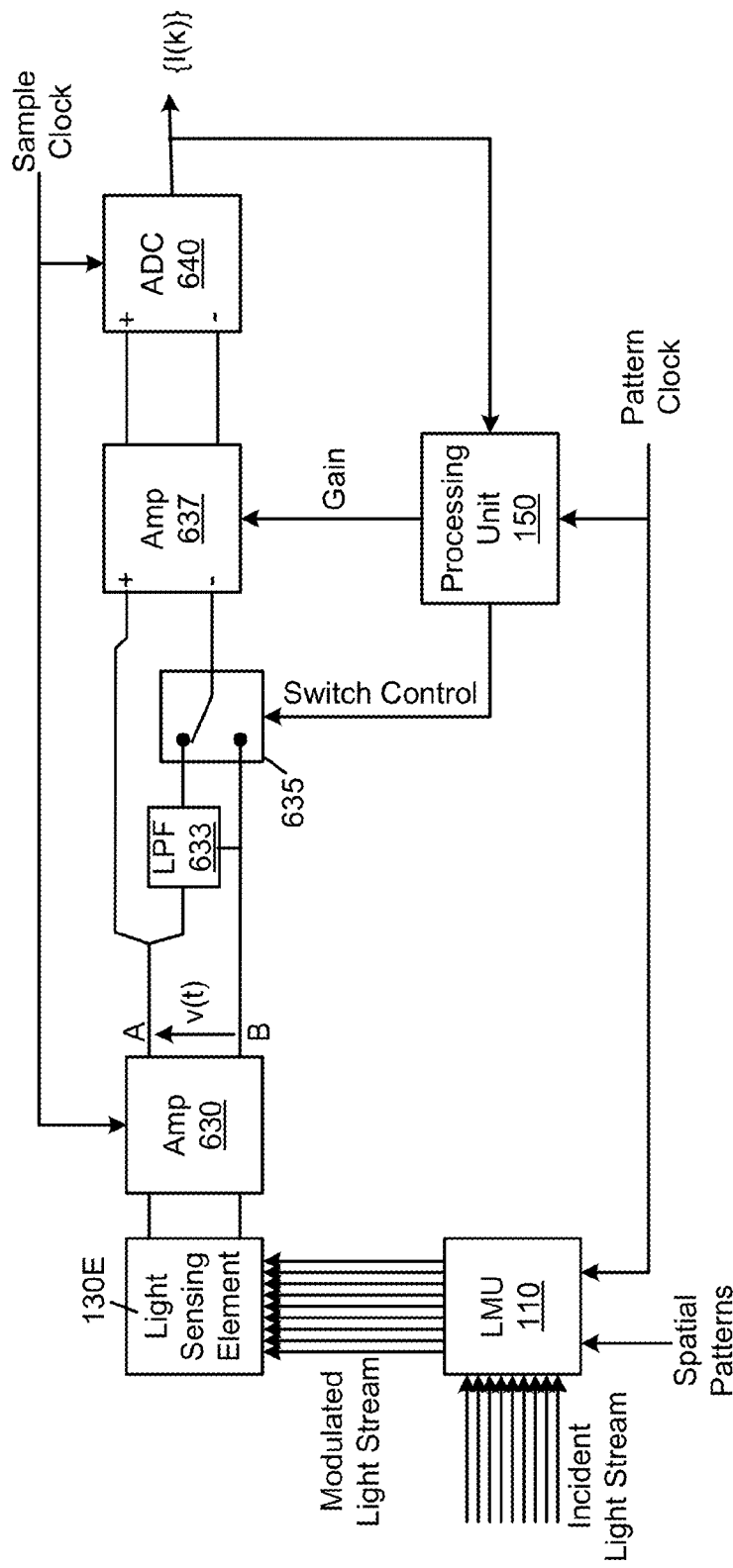
FIG. 16 illustrates an embodiment of a system 600 where the switch 635 couples the minus input of the amplifier 637 to the output of the lowpass filter 633 or to the terminal B of the amplifier 630.

In yet another embodiment, system 600 may be configured as shown in FIG. 16. The lowpass filter 633 generate an output signal that represents the average value of the electrical signal v(t). The terminal A is connected to the plus input of the amplifier 637. The switch 635 selectively couples the terminal B or the output of lowpass filter 633 to the minus input of the amplifier 637. In the initial mode, processing unit 150 directs the switch 635 to couple to terminal B. In the image acquisition mode, the processing unit directs the switch to couple to the output of the lowpass filter 633.

Figure 17:
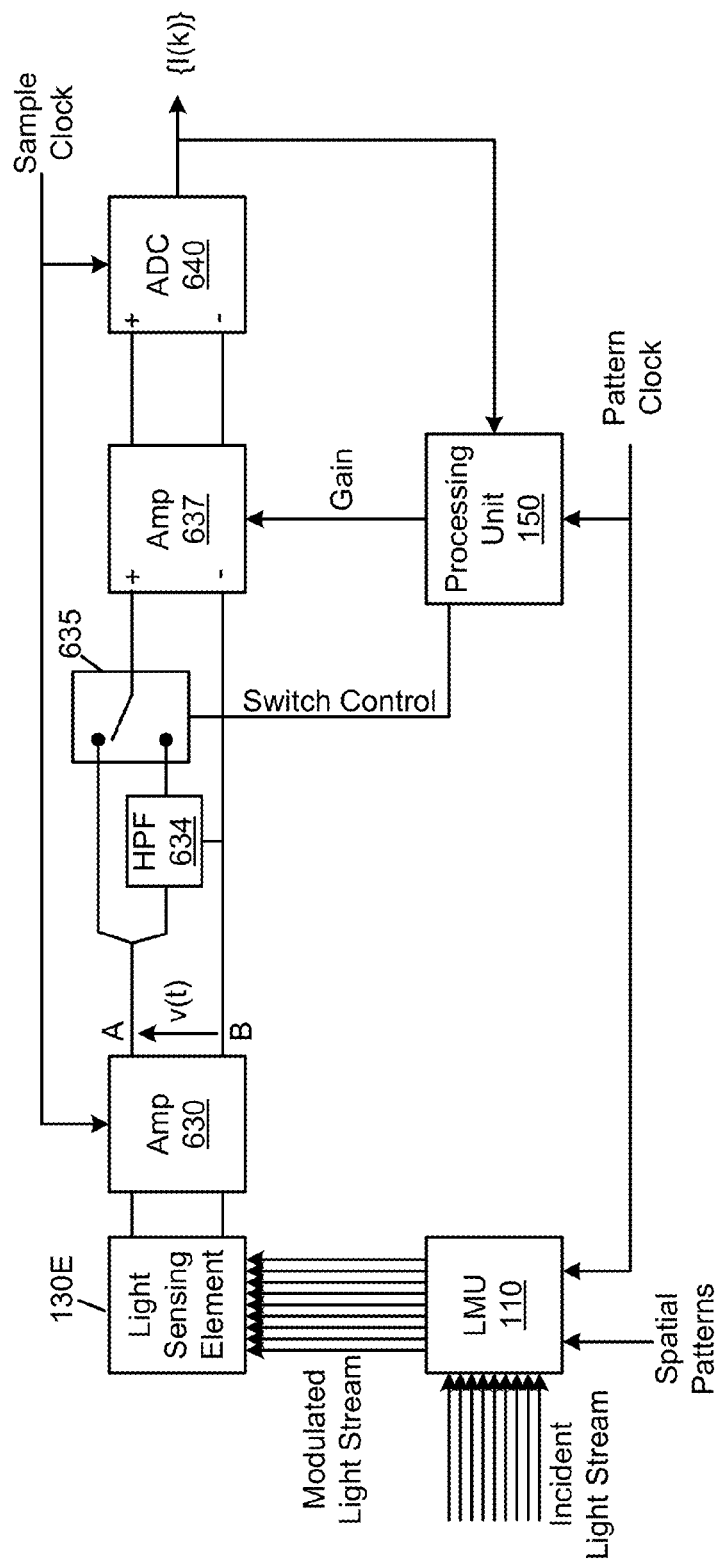
FIG. 17 illustrates an embodiment of a system 600 where the switch 635 couples the plus input of the amplifier 637 to the terminal A of the amplifier 630 or to the output of highpass filter 637.

In yet another embodiment, system 600 may be configured as shown in FIG. 17. The highpass filter 634 generates an output signal that represents the AC component of the electrical signal v(t), i.e., represents the electrical signal v(t) minus its average value. In some embodiments, the high pass filter may also be configured to attenuate (or remove) low frequency noise such as power line noise and/or light noise due to electrical lighting from the electrical signal v(t). The terminal B is coupled to the minus input of the amplifier 637. The switch 635 selectively couples either the terminal A or the output of the highpass filter 634 to the plus input of the amplifier 637. In the initial mode, processing unit 150 directs the switch 635 to couple to terminal A. In the image acquisition mode, the processing unit directs the switch to couple to the output of the highpass filter.

As described above, the sample sequence $Z_M$ is usable to construct an N-pixel image. Prior to image construction, the set $Z_M$ of samples may be restored by adding the adjustable baseline voltage (or an estimate of the average value of the electrical signal v(t)) to each sample of the set $Z_M$, thereby obtaining a restored sample set. The restored sample set may then be used to perform the image construction algorithm. The adjustable baseline voltage may be known by measurement. For example, the switching subsystem 635 may include a state in which it couples the adjustable baseline voltage ABV to the input x(t) of the amplifier 637, to support measurement of the adjustable baseline voltage by the ADC 640. In embodiments where the adjustable baseline voltage is produced by the DAC 650, the adjustable baseline voltage may be inferred from the digital input value supplied to the DAC.

Method 1800

In some embodiments, a method 1800 may involve the actions shown in FIG. 18A. The method 1800 may be performed using the system 600, in any of its various embodiments.

Action 1810 includes amplifying an electrical signal with an initial gain in order to obtain an initial amplified signal, e.g., as variously described above. The amplification may be performed by an amplifier, e.g., the amplifier 637 described above. The electrical signal represents intensity of a modulated light stream as a function of time. The modulated light stream is produced by modulating an incident stream of light with a sequence of spatial patterns, e.g., as variously described above.

Action 1820 includes acquiring one or more samples of the initial amplified signal, e.g., as variously described above. The one or more samples may correspond to one or more calibration patterns included in the sequence of spatial patterns.

Action 1830 includes determining an estimate of an average value of the electrical signal based on the one or more samples, e.g., as variously described above.

Action 1840 includes amplifying a difference between the electrical signal and an adjustable baseline voltage with a second gain in order to obtain a second amplified signal, e.g., as variously described above. (This amplifying action may be performed by the same amplifier as used for the amplifying action 1810.) The second gain is larger than the initial gain. The adjustable baseline voltage may be approximately equal to (or correspond to, or based on, or derived from) the average value estimate. For example, the adjustable baseline voltage may be arranged to be within +/−C*AVG/sqrt(N) of the estimated average value, where AVG is the average value estimate, where C is a positive real number less than 20. In different embodiments, the number C may take different values. For example, in different sets of embodiments, the number C may be, respectively, less than or equal to 4, less than or equal to 2, less than or equal to 1, less than or equal to ½, less than or equal to ¼, less than or equal to ⅛.

Action 1850 includes acquiring samples of the second amplified signal corresponding to measurement patterns included in the sequence of spatial patterns.

The measurement patterns may be configured as variously described above. In some embodiments, the measurement patterns may be pseudo-random patterns, e.g., as variously described above.

In some embodiments, the samples of the second amplified signal include a set of samples corresponding to M of the measurement patterns, and the set of samples is usable to construct an N-pixel image representing the incident light stream, where M is smaller than N, where N is the number of light modulating elements used to modulated the incident light stream. The compression ratio M/N may take different values in different embodiments, or in different imaging contexts, or in different noise environments, e.g., as variously described above.

In some embodiments, the second gain is based on an estimate of a standard deviation of the electrical signal. The standard deviation may determined according the expression AVG/Sqrt(N), where AVG is the estimate of the average value of the electrical signal, where N is the number of light modulating element in the light modulation unit that modulates the incident light stream.

In some embodiments, the method 1800 also includes lowpass filtering the electrical signal to generate the adjustable baseline voltage.

In some embodiments, the one or more calibration patterns include a maximal light transfer pattern and a minimal light transfer pattern as described above.

In one embodiment, a method for increasing the dynamic range associated with a CS acquisition may include: amplifying an electrical signal with a first gain in order to obtain a first amplified signal, wherein said amplifying is performed by an amplifier, wherein the electrical signal represents intensity of a modulated light stream as a function of time, wherein the modulated light stream is produced by modulating an incident stream of light with a sequence of spatial patterns; acquiring one or more samples of the first amplified signal corresponding to one or more calibration patterns included in the sequence of spatial patterns; determining an estimate of an average value of the electrical signal based on the one or more samples; amplifying a highpass filtered version of the electrical signal with a second gain in order to obtain a second amplified signal, wherein the second gain is larger than the first gain; and acquiring samples of the second amplified signal corresponding to measurement patterns included in the sequence of spatial patterns. This embodiment may incorporate any subset of the features, method actions and embodiments described above.

In a compressive sensing device, it is possible for the system, before acquiring the sensor measurements that are to be used to reconstruct an image frame, to estimate the range of luminosity to be expected in those sensor measurements. This estimation can be accomplished by making a reasonably small number of preliminary sensor measurements, to determine the range of expected ADC output values. This information can be used by a processing element to minimize noise by dynamically controlling the performance of the components in the data path.

The luminosity dynamic range of an image may be described as the range of luminosity between the darkest pixel in the image, and the brightest pixel in the image. For example, an image taken outside on a shady day has a smaller range of luminosity between the darkest and brightest pixels of the image, compared to an image taken on a sunny day where the image includes the sun and also objects in deep shadow.

In a conventional digital camera, the image output, in the optimal dynamic range case, assigns the brightest pixel a full scale luminosity digital output, and the darkest pixel a zero scale luminosity digital output. This optimal dynamic range can be achieved by a range scaling ADC that includes both a pre-amplifier and an ADC block, and where the ADC has its pre-amplifier gain and offset setting adjusted to achieve the ideal output code assignments. With such a range-scaling ADC, the step size of the ADC is minimized, allowing the smallest possible differences in luminosity to be measured for a given number of bits of the ADC. A digital camera may have one ADC per row or column, or only one for the entire array.

The dynamic range of digital cameras is rather limited. A full well in a CCD camera might be on the order of 50,000 electrons, while the minimum readout noise (which sets the lower bound of detectable light levels) might be on the order of 5 electrons rms. So the dynamic range of this CCD camera would be on the order of 1e4, corresponding to about 14 bits in an ADC, if the ADC gain and offset were suitably set.

A similar effect occurs in film cameras. In this case, the signal is not a digital output from an ADC but the photometric density of grains in the film. In general, film has much higher dynamic range than digital cameras but the principle is the same. At low light levels, the image is lost in the noise, and at high light levels the image saturates and detail is lost.

Compressive sensing (CS) devices do not suffer from the same dynamic range limitations as do standard pixel arrays. In some embodiments, a CS device may include a spatial light modulator (with N light modulating elements) and a single photosensor or a small small number of photosensors (e.g., less than 40 photosensors). For example, consider a sequence of measurements in the single photosensor case. In some embodiments, the spatial patterns supplied to the light modulation unit during image/video acquisition are random patterns, with each pattern configured so that approximately ½ of the light modulating elements will be ON, yielding a photo-voltage at the detector of value V0. If all the light modulating elements were on, one would measure 2V0. For a set of M random patterns, we expect the corresponding voltage measurements to be clustered around V0 with standard deviation on the order of V0/sqrt(N) (for perfectly random images). Let us consider a case in which about 1% of the light modulating elements have 100× more intensity than the others (e.g., the sun appears in 10% of the linear field of view of the device). This will cause the average photo voltage to increase by a factor of 2 compared to the uniform case, and the standard deviation of the measurements will still be on the order of 2V0/sqrt(N). A pixel array would have a large section of the image (and maybe all of it) wiped out by the higher illumination, whereas the CS device only needs to accommodate a factor of two increase in photo voltage. So the dynamic range is in principle much higher than for a pixel array. The practical limit to the dynamic range comes not from the quantization noise or the gain range of the ADC but the technical noise on the source or just the white shot noise or Johnson noise of the detector system.

Minimizing the Impact of ADC-Induced Noise by Adjusting the Analog Input Signal to the ADC To prevent quantization noise and other ADC noise from dominating the noise properties of the image, we can quantize the signal with enough bits so that the ADC noise (ideally 1/sqrt(12) the minimum AD unit rms) is much smaller than the other sources of noise in the system, and is as small as possible relative to the signal amplitude.

Sources of ADC noise:

1. Quantization noise: An ADC will convert the analog input signal into a digital output code. For example, an n-bit ADC will have $2^n$ digital output codes that are used to digitize the full analog input. A number of closely related analog input values may be converted to the same output code because there are not an infinite number of digital output codes. The error caused by the finite number of output codes is called quantization error. The maximum quantization error is bounded by the full scale analog input range divided by $(2^n)/2$.

2. Inherent electrical noise: An ADC will have some output noise even in the presence of a constant, noise-free analog input signal (for example, shot noise).

Figure 18B:
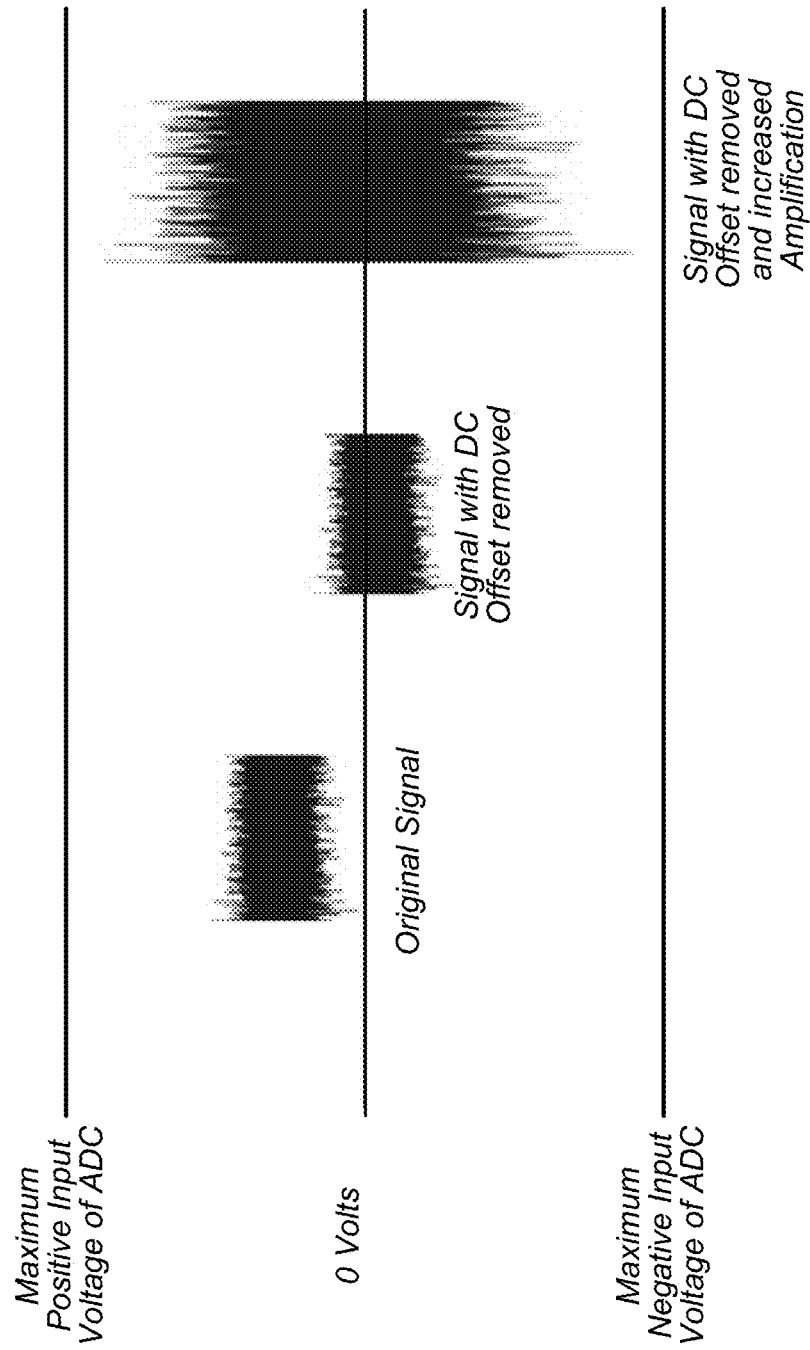
FIG. 18B illustrates an example of a detector signal, the detector signal with DC offset removed, and the detector signal with DC offset remove and with amplification.

ADC noise can be minimized by subtracting off (at least approximately) the DC value of the signal, V0, and sampling the difference signal. FIG. 18B shows the original signal (left) and the difference signal (middle). As suggested by the signal graph at the right of the figure, the difference signal may be amplified (prior to sampling) so that it fills more (or most) of the ADC input range.

In some embodiments, the CS device may be configured to generate a baseline voltage near V0, within say +/−V0/(2 sqrt(N)), and then a differential ADC measurement may be performed between the signal and the baseline voltage, with the ADC full scale adjusted to on the order of about 10-20 times V0/sqrt(N). The baseline voltage could be generated (for example) by a DAC with sufficiently high resolution. To estimate the DC value V0, a preamble sequence could be applied to the spatial light modulator to allow measurement of the full scale level (2V0) and the zero level. Alternatively, a standard exemplary pattern of 50% on/off pixels could be applied and measured. Prior to image reconstruction, the baseline voltage may be added back in to the measurement set to obtain a restored measurement set. The image reconstruction operates on the restored measurement set. The baseline voltage can be determined from the code provided to the DAC, or could be measured by the full-scale ADC that is used to measure the full scale 2V0 value.

The method can be modified to account for drift in DC value of source illumination. An improvement is to perform a "preamble" pattern sequence at regular intervals, faster than the expected drift. The preamble would may include a fully-on spatial pattern and a fully-off spatial pattern in order to measure the value of V0 (and its offset) accurately. With every preamble sequence, a new DC value is generated (essentially a new V0). The measurement would be performed by an ADC set to have full scale range at least as large as 2V0. Then a DAC could be used (for example) to generate the corresponding DC voltage for subtraction from the signal. If the preamble is applied often enough, it may be possible to remove much of the full-scale drift and baseline drifts in a CS measurement. Full-scale drift is a change of the maximum value (or average value V0) seen by the detector due to a change in the illumination level from the source being imaged. For instance if the illumination level on the source being imaged changed by +20%, the full-scale drift would also be +20%. Baseline drift is a change in the output signal level when there is no light incident on the camera. In the ideal case, when no light is incident on the camera, the detector's output signal level should be zero. However in a real circuit there usually is a nonzero-signal in this case, which we term the baseline signal. The baseline signal can arise from various sources, including dark current in the detector, offset voltage of the amplifier, etc.

Hot Spot Identification and Correction

In one set of embodiments, a method 1900 for identifying one or more hot spots in an incident light stream may include the actions shown in FIG. 19. The method 1900 may be performed by any of the various systems described above, e.g., by system 100 or system realization 200 or system 600.

Method 1900 is a method for operating a device including an array of light modulating elements and a light sensing device, e.g., as variously described above. The array of light modulating elements is configured to modulate an incident light stream. Each of the light modulating elements is configured to modulate a corresponding portion of the incident light stream, e.g., as variously described above.

Action 1910 includes executing a search algorithm to identify a subset of the array of light modulating elements where intensity (e.g., average energy per unit area) of the incident light stream is above an intensity threshold. The action of executing the search algorithm may include operations 1912-1918 described below. The search algorithm may be directed (controlled) by the processing unit 150 as described above (e.g., by a microprocessor operating under program control).

Action 1912 includes generating a sequence of spatial patterns $\{P(k)\}$, or directing some other agent (such as control unit 120) to generate the sequence of spatial patterns $\{P(k)\}$.

Action 1914 includes modulating the incident stream of light with the sequence of spatial patterns $\{P(k)\}$ to produce a modulated light stream $MLS_1$ (or directing some other agent such as the light modulation unit 110 to modulate the incident light stream with the pattern sequence $\{P(k)\}$). The action of modulating the incident light stream is performed by the array of light modulating elements.

Action 1916 includes receiving samples $\{I_1(k)\}$ of an electrical signal produced by the light sensing device. The samples $\{I_1(k)\}$ represent intensity of the modulated light stream $MLS_1$ as a function of time.

Action 1918 includes operating on the samples $\{I_1(k)\}$ to identify the subset of array elements where the intensity of the incident light stream is above the intensity threshold. This action of operating on the samples may be performed by processing unit 150 (e.g., by a microprocessor under program control).

Figure 20:
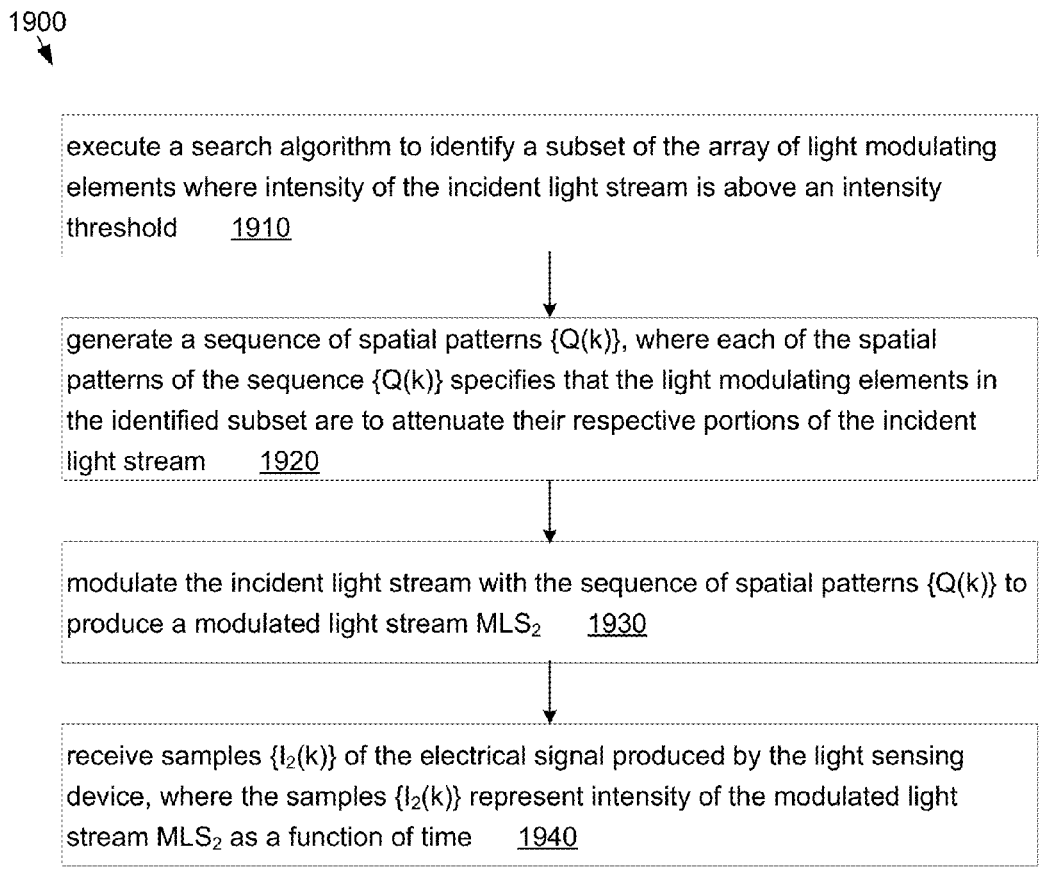
FIG. 20 illustrates one embodiment of a method 1900 for attenuating or removing a high-intensity region(s) in an incident light stream.

In some embodiments, the method 1900 also includes actions 1920-1940 as shown in FIG. 20.

Action 1920 includes generating a sequence of spatial patterns $\{Q(k)\}$ (or directing the control unit 120 to generate the sequence of spatial patterns $\{Q(k)\}$), where each of the spatial patterns of the sequence $\{Q(k)\}$ specifies that the light modulating elements in the identified subset are to attenuate their respective portions of the incident light stream. In some embodiments, a sequence of measurement patterns (e.g., drawn from any of the various measurement vector sets described above) may be modified to obtain a modified sequence of patterns, and the modified sequence may be used as the pattern sequence $\{Q(k)\}$. Each of the measurement patterns may be modified by attenuating (e.g., scaling by a factor less than one) the values of measurement pattern that correspond to the identified subset. Outside the identified subset, the values of the measurement pattern may be unmodified. (Note that the term "attenuate" includes within its scope of meaning the possibility of completely nullifying—setting to the OFF state—the pattern values corresponding to the identified subset.)

Action 1930 includes modulating the incident light stream with the sequence of spatial patterns $\{Q(k)\}$ to produce a modulated light stream $MLS_2$. The modulating action is performed by the array of light modulating elements and implements the attenuation of the incident light portions that correspond to the identified subset. The attenuation of a light portion of the incident light stream means that the corresponding modulated light portion that becomes a part of the modulated light stream $MLS_2$ is decreased in intensity relative to the incident light portion.

Action 1940 includes receiving samples $\{I_2(k)\}$ of the electrical signal produced by the light sensing device. The samples $\{I_2(k)\}$ represent intensity of the modulated light stream $MLS_2$ as a function of time. The samples $\{I_2(k)\}$ are usable to construct an image or video sequence representing the incident light stream.

In some embodiments, the action of modulating the incident light stream with the sequence of spatial patterns $\{Q(k)\}$ includes attenuating the portions of the incident light stream corresponding to the identified subset by dithering (or duty cycling) the respective light modulating elements during a period of application of each spatial pattern of the sequence $\{Q(k)\}$. A light modulating element may be dithered by changing its modulation state within a pattern modulation period. For example, by forcing the element to spend p percent of the modulation period in the ON state and the remaining portion of the modulation period in the OFF state, the element can effectively multiply the intensity of the incident light portion by the scalar factor $p/100$.

In some embodiments, each of the spatial patterns of the sequence $\{Q(k)\}$ specifies that the light modulating elements in the identified subset are to nullify their respective portions of the incident light stream. (For example, in the case where the light modulation unit is a DMD, each of the spatial patterns $\{Q(k)\}$ may be configured to turn OFF micromirrors within the identified subset.) Thus, the portions of the incident light stream corresponding to the identified subset may be prohibited from entering into the modulated light stream $MLS_2$.

In some embodiments, the search algorithm of action 1910 includes a binary search algorithm. However, other types of searches may also be used.

In some embodiments, the sequence of spatial patterns $\{P(k)\}$ includes search patterns representing a partition of the array of light modulating elements into a collection of non-overlapping regions. Each of the search patterns corresponds to a respective one of the regions. (For example, each of the search patterns may specify the maximum transfer state for light modulating elements belonging to the corresponding region, and specify the minimum transfer state for light modulating elements outside the corresponding region.) The action of operating on the samples $\{I_1(k)\}$ may include extracting search samples corresponding to the search patterns from the samples $\{I_1(k)\}$, and determining one or more of the search samples whose amplitudes exceed a voltage threshold $V_R$ (or an energy-per-unit-area threshold).

In some embodiments, the method 1900 also includes injecting refined search patterns into the sequence of spatial patterns $\{P(k)\}$, where the refined search patterns are localized to a neighborhood of the one or more regions that correspond to one or more threshold-exceeding search samples. By saying that a refined spatial pattern is localized to a neighborhood in the light modulating array means that it is zero (OFF) outside of the neighborhood. A neighborhood of a set of regions is a subset of the light modulating array that contains the set of regions.

In some embodiments, the voltage threshold $V_R$ may be used to implement the above-mentioned intensity threshold.

In some embodiments, the voltage threshold $V_R$ may be programmable.

In some embodiments, the threshold $V_R$ may be set to value representing a predetermined percentage of the full scale voltage output of the light sensing device 130, e.g., a percentage determined based on the area of each region and the intensity threshold.

In some embodiments, the threshold $V_R$ may be set based on knowledge of voltage values $V_{MAX}$ and $V_{MIN}$, where $V_{MAX}$ is the voltage produced by the light sensing device 130 in response to the assertion of a maximal light transfer pattern by the light modulating array, where $V_{MIN}$ is the voltage produced by the light sensing device 130 in response to the assertion of a minimal light transfer pattern by the light modulating array. For example, the voltage threshold may be set to $V_R = V_{MIN} + \alpha(V_{MAX} - V_{MIN})$, where $\alpha$ is a positive real number less than one. The parameter $\alpha$ may be programmable and/or determined by user input. In some embodiments, the method 1900 includes inserting the maximal light transfer pattern and the minimal light transfer pattern into the pattern sequence $\{P(k)\}$, extracting the corresponding samples from the sample sequence $\{I_1(k)\}$, and then computing the threshold $V_R$ based on the extracted samples.

In some embodiments, the processing unit 150 may perform a histogram on the search samples, and determine the voltage threshold based on the histogram.

In some embodiments, the voltage threshold may be determined based on user input.

As an alternative to determining the one or more search samples that exceed a voltage threshold, the method 1900 may involve determining the $n_L$ largest of the search samples, where $n_L$ is a positive integer. In some embodiments, the method 1900 also includes injecting refined search patterns into the pattern sequence $\{P(k)\}$, where the refined search patterns are localized to a neighborhood of the $n_L$ regions that correspond to the $n_L$ largest of the search samples.

The integer $n_L$ may have different values in different embodiments. In some embodiments, the value of integer $n_L$ may be programmable. In some embodiments, the value of integer $n_L$ may vary dynamically.

In some embodiments, the integer $n_L$ may be related to the number of regions $n_R$ in the above-mentioned collection of regions. For example, in different sets of embodiments, the ratio $n_L/n_R$ may be, respectively, less than or equal to 0.01, less than or equal to 0.05, less than or equal to 0.1, less than or equal to 0.2, less than or equal to 0.3, less than or equal to 0.4, less than or equal to 0.6, less than or equal to 0.8.

In some embodiments, the current value of the integer $n_L$ may be based on the size of a previously-identified hot spot (intensely bright area) in the incident light stream.

In some embodiments, the regions discussed above are equal-area regions. In other embodiments, the regions may have non-uniform areas, in which case the processing unit 150 may normalize the search samples so that they represent energy per unit area over the respective regions. For example, each search sample may be divided by the area of the corresponding region to obtain the corresponding normalized sample.

In some embodiments, each of the regions is a contiguous region, e.g., a convex region such as a rectangle, a triangle or a hexagon.

In some embodiments, the sequence of spatial patterns $\{P(k)\}$ includes search patterns, where each of the search patterns corresponds to a respective rectangular subset of the array of light modulating elements.

In some embodiments, the sequence of spatial patterns $\{P(k)\}$ includes a sequence of overlapping angular sector patterns and/or a sequence of overlapping concentric annular patterns.

In some embodiments, the sequence of spatial patterns $\{P(k)\}$ includes a sequence of overlapping parallel band patterns, and the action 1918 of operating on the samples $\{I_1(k)\}$ includes identifying a subset of the samples $\{I_1(k)\}$ that correspond to the band patterns and selecting one of the samples from the identified subset of samples whose amplitude is maximum. (For example, the processing unit 150 may slide an initial band pattern across the light modulating array in the direction perpendicular to the band's long axis.) After the maximizing sample is selected, a sequence of rectangle patterns (e.g. overlapping rectangle patterns) may be inserted into the sequence of spatial patterns $\{P(k)\}$, where the rectangular patterns are restricted to the maximizing band pattern (i.e., the band pattern corresponding to the maximizing sample). This allows the processing unit 150 to identify where the hot spot is located within the maximizing band pattern.

In some embodiments, the first sequence of spatial pattern includes search patterns, where the search patterns include one or more patterns that correspond to respective translates of a previously-identified hot spot region. Since the position and area of a hot spot are likely to vary continuously in time, the search patterns may be designed to search a neighborhood of the previously-identified hot spot region. Thus, each of the search patterns may be a vector-translated version of the previously-identified hot spot region, with each pattern using a different translation vector.

Figure 21:
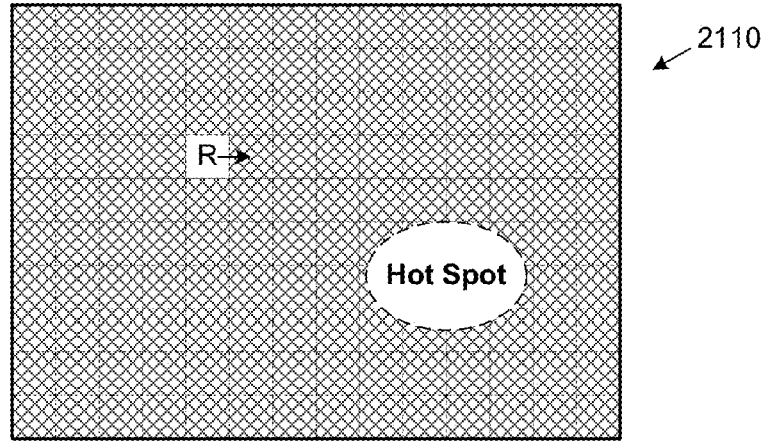
FIG. 21 illustrates a process of scanning a region R through the array of light modulating elements, in order to locate a hot spot, according to one embodiment.

FIG. 21 shows one embodiment of the search algorithm 1910. The sequence of spatial patterns $\{P(k)\}$ is arranged so that a rectangular region R moves through the light modulating array 2110 in a raster fashion. In any given spatial pattern, the light modulating elements in the region R may be turned ON, and the light modulating elements outside in the region R may be turned OFF. The area of the array covered by the hot spot(s) is indicated by large values of sample amplitude, i.e., amplitude of samples $\{I_1(k)\}$ from the ADC 140 (or the ADC 640). It is noted that the presence of single hot spot in FIG. 21 is not meant to be limiting. Indeed, the design principles described herein may be used to identify a plurality of hot spots. Furthermore, the size of the region R shown in FIG. 21 relative to the light modulating array is not meant to be limiting. A wide range of sizes are contemplated.

In some embodiments, the region R is moved so that successive instances of the region (between on pattern and the next) overlap with each other.

Figure 22:
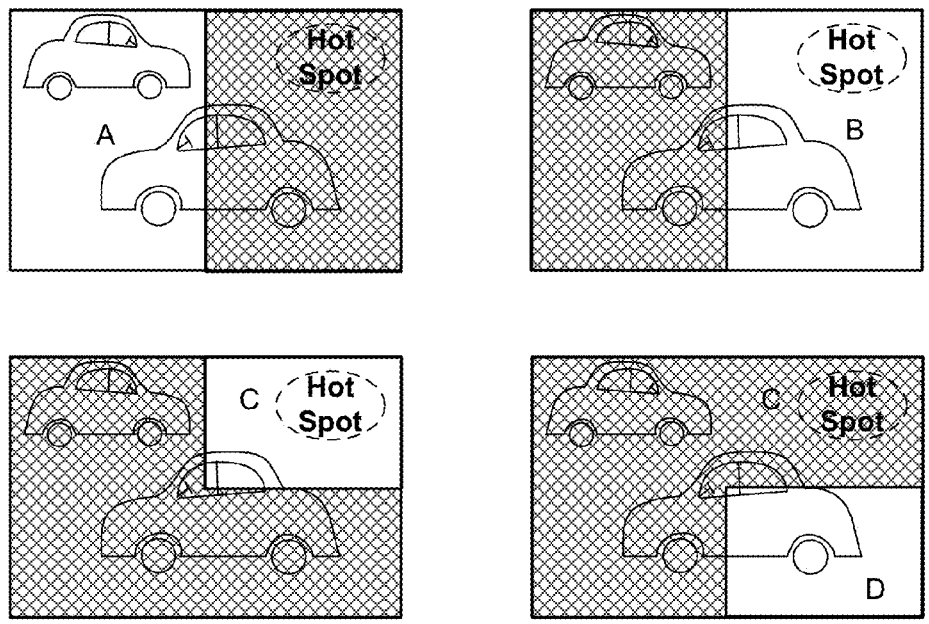
FIG. 22 illustrates a binary search process for locating a hot spot in the incident light stream, according to one embodiment.

FIG. 22 illustrates one embodiment, where the search algorithm is organized as a binary search. The spatial pattern A is ON over the left half of the array, and OFF over the right half of the array. The second spatial pattern B is the complement of pattern A. Spatial pattern C is turned ON only in the upper right quadrant. Spatial pattern D is turned ON only in the lower right quadrant. The incident light stream has a hot spot located as shown in the upper right quadrant. (For example, in a visible-light application, the hot spot might be the sun or the reflection of the sun off a building.) The processing unit 150 may start by directing the light modulating array to apply patterns A and B to the incident light stream. For the image shown, the sample induced by pattern B will be significantly larger than the sample induced by pattern A. The processing unit 150 may then eliminate pattern A and descend to sub-regions of pattern B. In particular, processing unit 150 may direct the light modulating array to apply patterns C and D. The sample induced by pattern C will be significantly larger than the sample induced by pattern D. Thus, the processing unit 150 may eliminate pattern D, and explore within pattern C.

In some embodiments, the binary search may explore along both regions if, at any given stage, the amplitudes of the corresponding induced samples are equal (or approximately equal).

In some embodiments, a binary search may be performed to determine a sub-region that is smaller than the hot spot and likely to be in the interior of the hot spot. Then an additional (non-binary) search may be performed, starting with the determined sub-region, to more precisely identify the boundary of the hot spot, e.g., by a process of growing from within the interior.

Figure 23A:
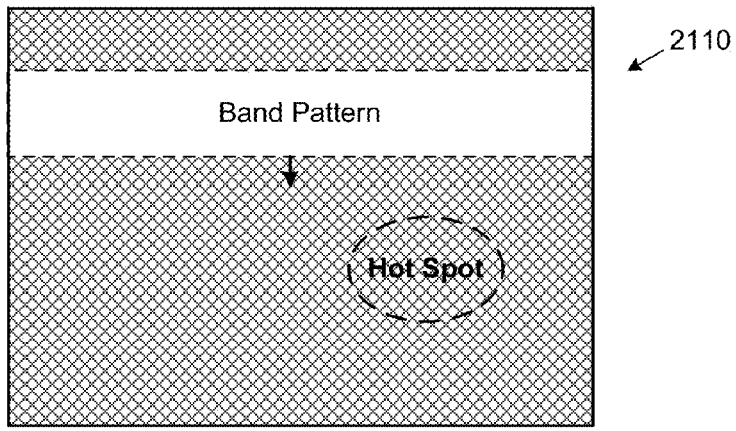
FIG. 23A illustrates a process of moving a band pattern through the light modulating array, according to one embodiment.
Figure 23B:
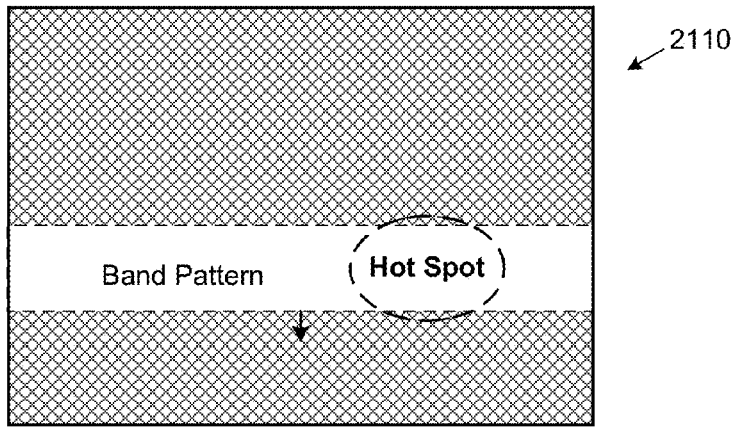
FIG. 23B illustrates a maximizing position of the band pattern.
Figure 23C:
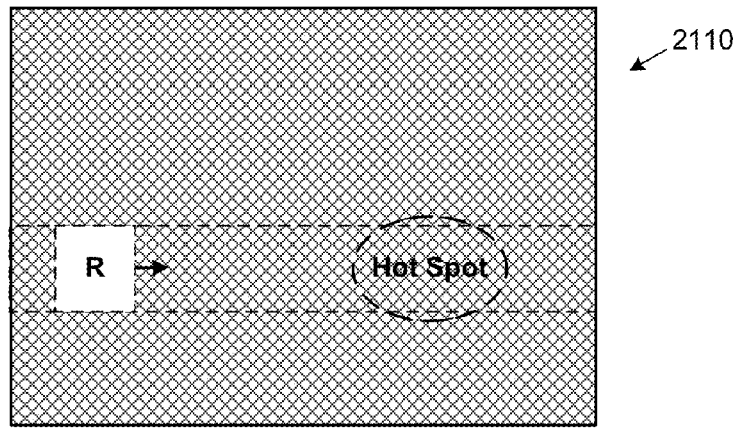
FIG. 23C illustrates a process of moving a region R across the light modulating array and within the maximizing band pattern, according to one embodiment.

In some embodiments, the search algorithm may involve sliding a band pattern across the light modulating array, e.g., in a direction perpendicular to the axis of the band pattern as shown FIG. 23A. The displacement of the band pattern between successive patterns of the sequence {P(k)} may programmable. When the band pattern cuts through the center of the hot spot, as suggested in FIG. 23B, the induced sample amplitude attains a maximum. The band pattern that achieves this condition may be referred to as the "maximizing band pattern". Once the maximizing band pattern has been identified, the processing unit 150 may insert patterns into the sequence {P(k)} to effect the sliding movement of a rectangle R within the maximizing band pattern as shown in FIG. 23C. This allows the processing unit 150 is to more precisely identify the area of the hot spot. When the rectangle traverses the boundary of the hot spot, the induced samples will exhibit a rapid rise in amplitude. The position of the rectangle that gives the maximum of induced sample amplitude may be used as an indicator of the hot spot location within the maximizing band.

Figure 24A:
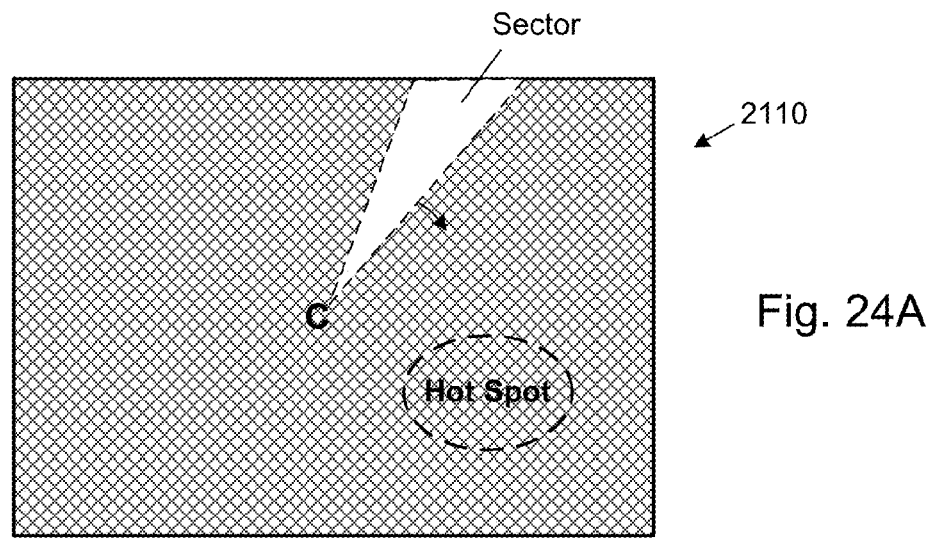
FIG. 24A illustrates one embodiment of a process of rotating a sector pattern within the light modulating array, in order to locate a hot spot.

In some embodiments, the search algorithm may involve inserting a sequence of sector patterns into the pattern sequence {P(k)} to effect the rotation of a sector region around a center position C of the light modulating array, e.g., as shown in FIG. 24A. A maximizing value of sample amplitude may be used as an indicator of the sector in which the hot spot reside. The sample amplitudes may be normalized prior to comparison/analysis to compensate for unequal sector areas. (A sector that intersects a corner of the array may be larger in area that a sector that intersects the midpoint of a side of the array.)

Figure 24B:
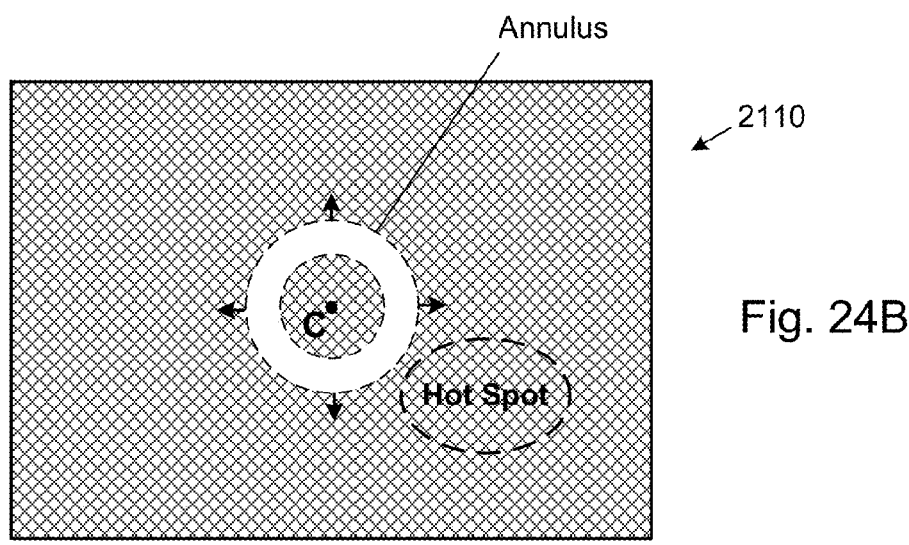
FIG. 24B illustrates one embodiment of a process of moving an annular ring pattern outward from a center of the light modulating array.

In some embodiments, the search algorithm may involve inserting a disk pattern and a sequence of annulus patterns into the pattern sequence {P(k)} to effect the expanding growth of an annulus about a constant center position C, e.g., as shown in FIG. 24B.

System 2500

Figure 25:
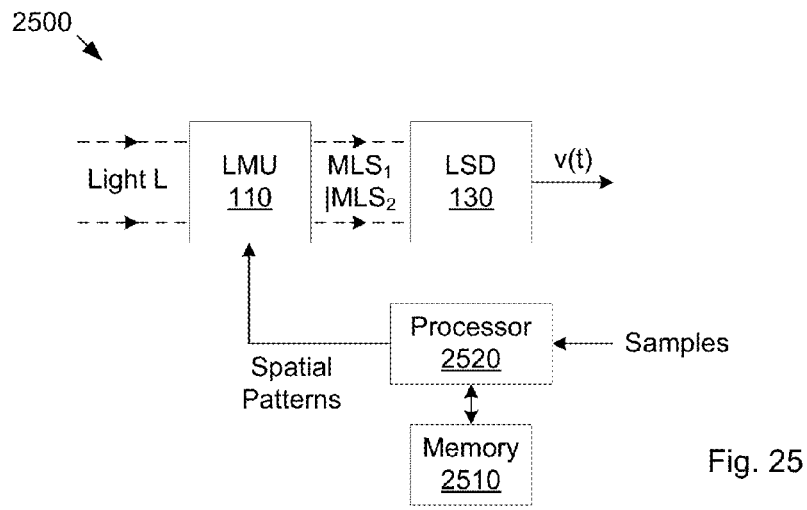
FIG. 25 illustrates one embodiment of a system 2500 for identifying high-intensity regions in the incident light stream.

In one set of embodiments, a system 2500 for identifying one or more hot spots in an incident light stream may be configured as shown in FIG. 25. The system 2500 may include the light modulation unit 110 and the light sensing device 130 as described above, and may also include memory 2510 and a processor 2520 (e.g., a set of one or more microprocessors). (Furthermore, system 2500 may include any subset of the features, embodiments and elements described above in connection with system 100, system realization 200, system 600 and method 1900.)

The light modulation unit 110 is configured to modulate an incident light stream L, e.g., as variously described above. The light modulation unit includes an array of light modulating elements, e.g., as variously described above.

Memory 2510 stores program instructions. The program instructions, when executed by the processor 2520, cause the processor to perform a search to identify a subset of the array of light modulating elements where intensity of the incident light stream is above an intensity threshold, e.g., as variously described above. The search includes: (a) supplying a first sequence {P(k)} of spatial patterns to the light modulation unit 110 so that the light modulation unit modulates the incident light stream with the first sequence of spatial patterns and thereby produces a first modulated light stream $MLS_1$; (b) receiving a first sequence of samples $\{I_1(k)\}$ of an electrical signal v(t) produced by the light sensing device 130, where the first sequence of samples $\{I_1(k)\}$ represents intensity of the first modulated light stream as a function of time; and (c) operating on the first sequence of samples $\{I_1(k)\}$ to identify the subset.

In some embodiments, the program instructions, when executed by the processor 2520, further cause the processor 2520 to: (d) supply a second sequence {Q(k)} of spatial patterns to the light modulation unit 110 so that the light modulation unit modulates the incident light stream with the second sequence of spatial patterns and thereby produces a second modulated light stream $MLS_2$, where each of the spatial patterns of the second sequence {Q(k)} specifies that the light modulating elements in the identified subset are to attenuate their respective portions of the incident light stream; and (e) receive a second sequence of samples $\{I_2(k)\}$ of the electrical signal v(t) produced by the light sensing device 130, where the second sequence of samples represents intensity of the second modulated light stream $MLS_2$ as a function of time. The second sequence of samples $\{I_2(k)\}$ is usable to construct an image or video sequence representing the incident light stream, e.g., as variously described above.

In some embodiments, each spatial pattern of the second sequence {Q(k)} specifies that the light modulation unit 110 is to attenuate the portions of the incident light stream corresponding to the identified subset by dithering the respective light modulating elements during a period of application of each spatial pattern of the second sequence {Q(k)}, e.g., as described above.

In some embodiments, each of the spatial patterns of the second sequence {Q(k)} specifies that the light modulating elements in the identified subset are to nullify their respective portions of the incident light stream, e.g., as described above.

In some embodiments, the first sequence of spatial patterns {P(k)} includes search patterns representing a partition of the array of light modulating elements into a collection of non-overlapping regions. Each of the search patterns corresponds to a respective one of the regions. (For example, each of the search patterns may specify the ON state for light modulating elements belonging to the respective region, and specify the OFF state for light modulating elements outside the respective region.) The action of operating on the first sequence of samples $\{I_1(k)\}$ may include: extracting search samples corresponding to the search patterns from the first sequence of samples; and determining one or more of the search samples that exceed a voltage threshold, e.g., as variously described above.

In some embodiments, the first sequence of spatial patterns {P(k)} may include search patterns, where each of the search patterns corresponds to a respective rectangular subset of the array of light modulating elements.

In some embodiments, the first sequence of spatial patterns {P(k)} includes a sequence of overlapping angular sector patterns or a sequence of overlapping concentric annular patterns.

In some embodiments, the first sequence of spatial patterns includes a sequence of overlapping parallel band patterns, where the action of operating on the first sequence of samples $\{I_1(k)\}$ includes identifying a subset of the first sequence of samples that correspond to the band patterns and selecting one of the samples from the identified subset whose amplitude is maximum. In one embodiment, the search also includes inserting a sequence of rectangle patterns in said first sequence of spatial patterns {P(k)}, where the sequence of rectangle patterns is restricted to the band pattern corresponding to the selected sample whose amplitude is maximum.

Figure 26:
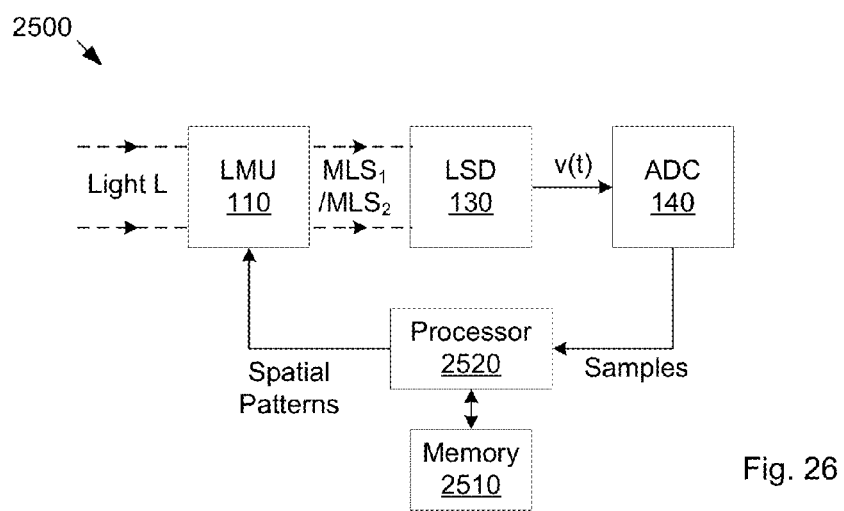
FIG. 26 illustrates an embodiment of a system 2500 where processor 2520 receives the samples provided by the ADC 140.

In some embodiments, system 2500 may include the analog-to-digital converter 140 as described above (or the analog-to-digital converter 640 described above). See FIG. 26.

The ADC 140 may be configured to acquire samples (e.g., the samples {I₁(k)} and the samples {I₁(k)}) of the electrical signal v(t) produced by the light sensing device 130.

Figure 27:
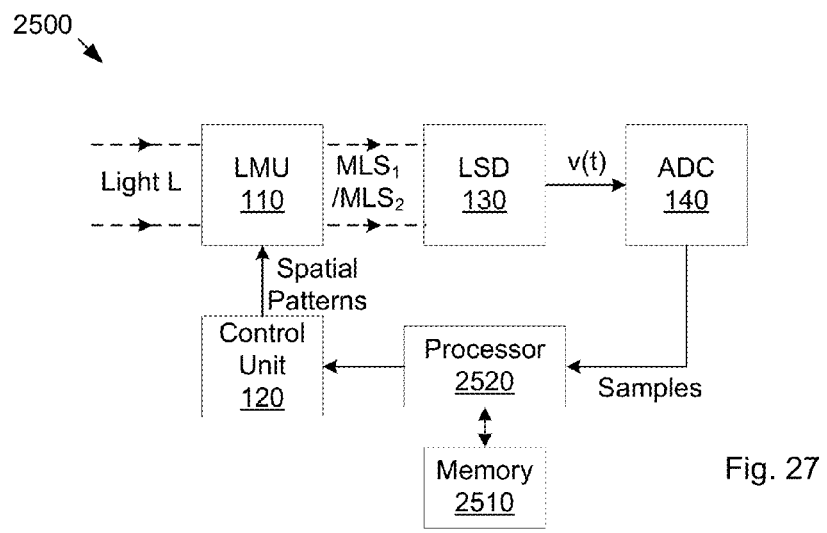
FIG. 27 illustrates an embodiment of a system 2500 where control unit 120 supplies spatial patterns to the light modulation unit 110.

In some embodiments, system 2500 may include the control unit 120 as described above. See FIG. 27. Control unit 120 may be configured to perform the function of generating the spatial patterns and/or supplying the spatial patterns to the light modulation unit 110. Thus, processor 2520 need not generate spatial patterns itself, but may direct the control unit 120 to generate the spatial patterns. For example, processor 2520 may send information to the control unit specifying the kind of spatial patterns (or characterizing parameters of the spatial patterns) that are to be used in any given context.

Increasing Dynamic Range by Excluding Bright Objects

Compressive sensing devices can apply novel techniques to further improve dynamic range performance, and achieve performance beyond the full scale performance of an ideal range scaling ADC.

One technique is the removal of intensely bright objects from the image before compressive sensing sensor measurements are made. In conventional cameras, and especially infrared cameras, the sun can saturate elements of the focal plane array. When this saturation happens, the signal can bleed into adjacent pixels or even wipe out an entire row or column of the image, so that not only the directly-saturated pixels are effected. In a CS device, before starting to read sensor measurements for an image frame, a number of spatial patterns may be supplied to the DMD to determine if a hot (intensely bright) spot exists on the micromirror array. One approach is a binary hot-spot search where initially the total energy on one half of the mirrors is compared to the total energy on the other half of the mirrors. If a significant difference in brightness exists, a similar binary test can be applied to the bright half to further locate the hot spot. This algorithm may be applied iteratively until the location of the hot spot is determined. Once the hot spot is detected and located, the patterns may be adjusted so that the mirrors that "see" the hot spot are never pointed at the sensor during the multiple samples needed to reconstruct the image frame. After the image is algorithmically reconstructed using the multiple samples, the image can be post processed to insert white information where those hot spot mirrors were located. Eliminating the brightest mirrors allows the scale of the range-scaling ADC to be set to provide better luminosity resolution and to prevent the noise in the bright source from swamping the signal from all the other mirrors (which would limit the dynamic range of the image on the low end).

A number of search techniques can be employed to find mirrors within a hot region of the DMD array. The binary search algorithm mentioned above is just one example of such a search.

Increasing Dynamic Range by Partially Excluding Bright Objects

In a variation on the pixel exclusion algorithm above, another approach is to dither the micro-mirror associated with a discovered bright object. The rate of on-states for a specific micro-mirror (where 'on' means that the image light is reflected to the detector) would be decreased from the normal compressive-sensing light modulation rate by a scaling factor. The result would be that a mirror would have a duty cycle lower than the nominal 50%. For example, with a 60% scaling factor, the mirror would nominally be in an on-state for 30% of the time.

Compressive Imaging System 2800

Figure 28:
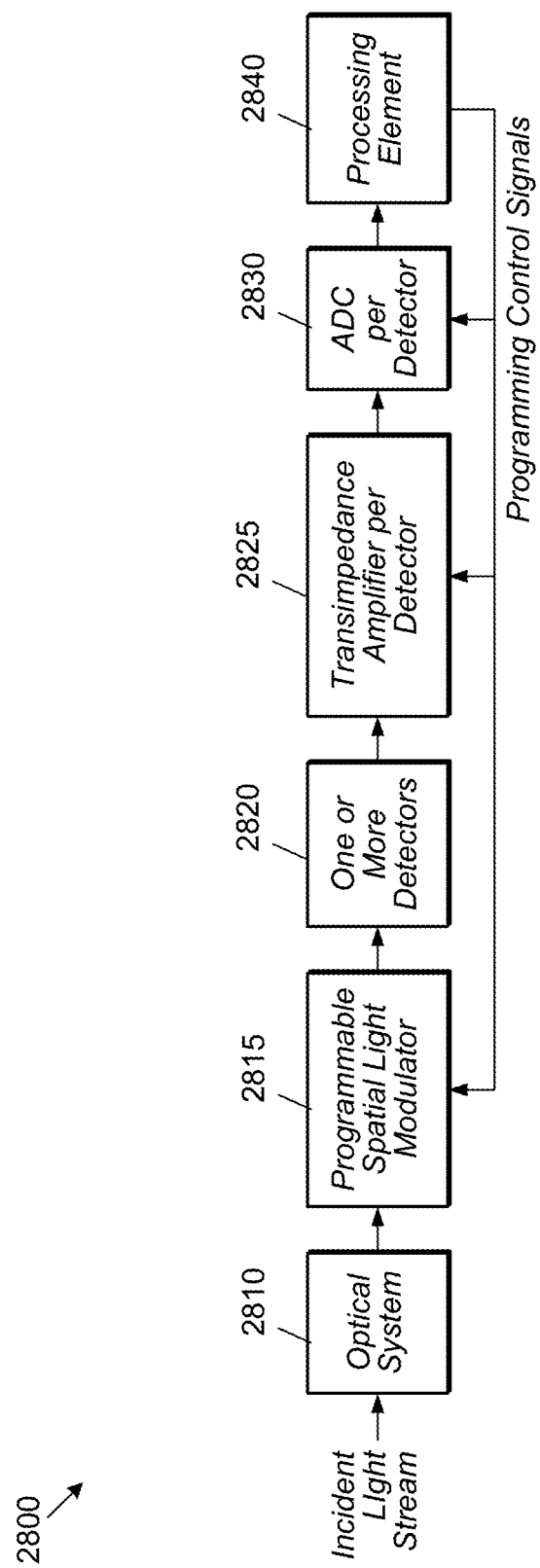
FIG. 28 illustrates one embodiment of a compressive imaging system 2800 including one or more detector channels.

In one set of embodiments, a compressive imaging system 2800 may be configured as shown in FIG. 28. The compressive imaging (CI) system may include an optical system 2810, a spatial light modulator 2815, a set 2820 of one or more photodetectors, a set 2825 of one or more amplifiers (i.e., one amplifier per detector), a set 2830 of analog-to-digital converters (one ADC per detector), and a processing element 2840.

The optical system 2810 focuses an incident light stream onto the spatial light modulator, e.g., as variously described above. See the discussion above regarding optical subsystem 105. The incident light stream carries an image (or a spectral ensemble of images) that is to be captured by the CI system in compressed form.

The spatial light modulator 2815 modulates the incident light stream with a sequence of spatial patterns to obtain a modulated light stream, e.g., as variously described above.

Each of the detectors 2820 generates a corresponding electrical signal that represents the intensity of a corresponding portion of the modulated light stream, e.g., a spatial portion or a spectral portion of the modulated light stream.

Each of the amplifiers 2825 (e.g., transimpedance amplifiers) amplifies the corresponding detector signal to produce a corresponding amplified signal.

Each of the ADCs 2830 acquires samples of the corresponding amplified signal.

The processing element 2840 may operate on the sample sets obtained by the respective ADCs to construct respective images. The images may represent spatial portions or spectral slices of the incident light stream. Alternatively, or additionally, the processing element may send the sample sets to a remote system for image construction.

The processing element 2840 may include one or more microprocessors configured to execute program instructions stored in a memory medium.

The processing element 2840 may be configured to control one or more other elements of the CI system. For example, in one embodiment, the processing element may be configured to control the spatial light modulator, the transimpedance amplifiers and the ADCs.

The processing element 2840 may be configured to perform any subset of the above-described methods on any or all of the detector channels. Each of the detector channels of system 2800 may include any subset of the embodiments, features, and elements described above. (A detector channel may include a corresponding detector, amplifier and ADC.) For example, each detector channel may include any of the above-described mechanisms for dynamic range optimization and/or any of the above-described mechanisms for the identification and attenuation of hot spots in the incident light field.

Compressive Imaging System 2900

Figure 29:
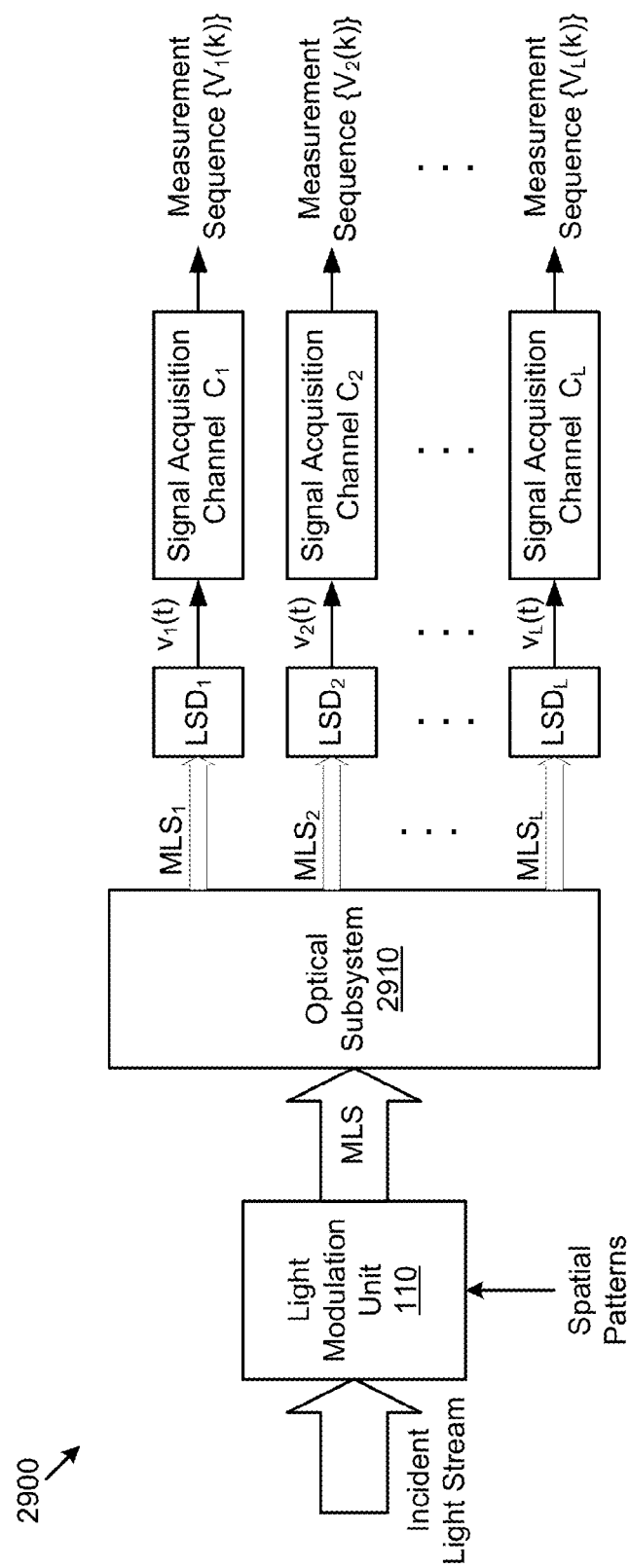
FIG. 29 illustrates one embodiment of a compressive imaging system 2900 where separate portions of the modulated light stream MLS are delivered to respective light sensing devices.

In one set of embodiments, a compressive imaging system 2900 may be configured as shown in FIG. 29. The compressive imaging system includes the light modulation unit 110 as variously described above, and also includes optical subsystem 2910, a set of L light sensing devices $LSD_1$ through $LSD_L$, and a set of L signal acquisition channels $C_1$ through $C_L$, where L in a positive integer.

The light modulation unit 110 receives an incident light stream and modulates the incident light stream with a sequence of spatial patterns to obtain a modulated light stream MLS, e.g., as variously described above.

The optical subsystem 2910 delivers portions (e.g., spatial portions or spectral portions) of the modulated light stream to corresponding ones of the light sensing devices $LSD_1$ through $LDS_L$.

For information on various mechanisms for delivering spatial subsets of the modulated light stream to respective light sensing devices, please see U.S. patent application Ser. No.

13/197,304, filed on Aug. 3, 2011, titled "Decreasing Image Acquisition Time for Compressive Imaging Devices", invented by Woods et al., which is hereby incorporated by reference in its entirety as though fully and completely set forth herein.

In some embodiments, the optical subsystem 2910 includes one or more lenses and/or one or more mirrors arranged so as to deliver spatial portions of the modulated light stream onto respective ones of the light sensing devices. For example, in one embodiment, the optical subsystem 2910 includes a lens whose object plane is the plane of the array of light modulating elements and whose image plane is a plane in which the light sensing devices are arranged. The light sensing devices may be arranged in an array.

In some embodiments, optical subsystem 2910 is configured to separate the modulated light stream into spectral components and deliver the spectral components onto respective ones of the light sensing devices. For example, optical subsystem 2910 may include a grating, a spectrometer, or a tunable filter such as a Fabry-Perot Interferometer to achieve the spectral separation.

Each light sensing device $LSD_j$ generates a corresponding electrical signal $v_j(t)$ that represents intensity of the corresponding portion $MLS_j$ of the modulated light stream.

Each signal acquisition channel $C_j$ acquires a corresponding sequence of samples $\{V_j(k)\}$ of the corresponding electrical signal $v_j(t)$. Each signal acquisition channel may include a corresponding amplifier (e.g., a TIA) and a corresponding A/D converter.

The sample sequence $\{V_j(k)\}$ obtained by each signal acquisition channel $C_j$ may be used to construct a corresponding sub-image which represents a spatial portion or a spectral slice of the incident light stream. The number of samples m in each sample sequence $\{V_j(k)\}$ may be less (typically much less than) the number of pixels in the corresponding sub-image. Thus, each signal acquisition channel $C_j$ may operate as a compressive sensing camera for a spatial portion or spectral portion of the incident light.

Each of the signal acquisition channels may include any subset of the embodiments, features, and elements described above.

System 2900 may also include the optical subsystem 2010 (or the optical subsystem 105) for focusing the incident light stream onto the light modulation unit 110.

Any of the various embodiments described herein may be combined to form composite embodiments. Furthermore, any of the various embodiments described in U.S. Provisional Application No. 61/372,826 and in U.S. patent application Ser. Nos. 13/193,553, 13/193,556 and 13/197,304 may be combined with any of the various embodiments described herein to form composite embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
    a light sensing device configured to receive a modulated light stream and to generate an electrical signal that represents intensity of the modulated light stream as a function of time, wherein the modulated light stream is produced by modulating an incident stream of light with a sequence of spatial patterns;
    an amplifier configured to amplify an input signal in order to obtain an amplified signal, wherein a gain of the amplifier is controllable;
    an analog-to-digital converter (ADC) configured to sample the amplified signal in order to obtain a sequence of samples;
    a switching subsystem configured to controllably select one of the following to be the input signal to the amplifier:
        (a) the electrical signal from the light sensing device, or
        (b) a difference signal representing a difference between the electrical signal and an adjustable baseline voltage.

2. The system of claim 1, further comprising a processing unit configured to:
    direct the switching subsystem to select (b) as the input signal to the amplifier, wherein the adjustable baseline voltage is set to be approximately equal to an average value of the electrical signal; and
    set the gain of the amplifier based on an estimate of a standard deviation of the electrical signal.

3. The system of claim 2, wherein the said modulating of the incident light stream is performed by a light modulation unit having N light modulating elements, wherein the estimate of the standard deviation is a scalar multiple of $1/\mathrm{Sqrt}(N)$.

4. The system of claim 1, further comprising:
    a digital-to-analog converter (DAC) configured to generate the adjustable baseline voltage based on a digital input word.

5. The system of claim 4, further comprising a processing unit configured to:
    set the digital input word of the DAC based on an estimate of an average value of the electrical signal;
    direct the switching subsystem to select (b) as the input signal to the amplifier; and
    set the gain of the amplifier based on a standard deviation of the electrical signal.

6. The system of claim 4, further comprising:
    a sum circuit configured to determine the difference signal by summing the electrical signal and the negative of the adjustable baseline voltage.

7. The system of claim 1, further comprising a processing unit configured to:
    set a gain of the amplifier to a first value;
    direct the switching subsystem to select (a) as the input signal to the amplifier; and
    determine an estimate for an average value of the electrical signal based on one or more of the samples of said sequence of samples.

8. The system of claim 7, wherein the one or more samples correspond to one or more calibration patterns included in the sequence of spatial patterns.

9. The system of claim 8, wherein the one or more calibration patterns include a maximal light transfer pattern and a minimal light transfer pattern.

10. The system of claim 8, wherein the one or more calibration patterns include at least one 50% transfer pattern, wherein the 50% transfer pattern is configured so that 50% of the power in the incident light stream passes on average into the modulated light stream.

11. The system of claim 8, wherein the one or more calibration patterns include one or more checkerboard patterns.

12. The system of claim 1, wherein the light sensing device includes a transimpedance amplifier (TIA), wherein the electrical signal is produced by the TIA.

13. The system of claim 1, wherein the spatial patterns are pseudo-random spatial patterns.

14. The system of claim 1, further comprising:
a filter configured to low-pass filter the electrical signal in order to generate the adjustable baseline voltage.

15. The system of claim 1, wherein the sequence of samples includes a set of samples corresponding to M of the spatial patterns, wherein the set of samples is usable to construct an N-pixel image representing the incident light stream, wherein M is smaller than N.

16. A method comprising:
amplifying an electrical signal with a first gain in order to obtain a first amplified signal, wherein said amplifying is performed by an amplifier, wherein the electrical signal represents intensity of a modulated light stream as a function of time, wherein the modulated light stream is produced by modulating an incident stream of light with a sequence of spatial patterns;
acquiring one or more samples of the first amplified signal corresponding to one or more calibration patterns included in the sequence of spatial patterns;
determining an estimate of an average value of the electrical signal based on the one or more samples;
amplifying a difference between the electrical signal and an adjustable baseline voltage with a second gain in order to obtain a second amplified signal, wherein the adjustable baseline voltage is approximately equal to the average value estimate, wherein the second gain is larger than the first gain;
acquiring samples of the second amplified signal corresponding to measurement patterns included in the sequence of spatial patterns.

17. The method of claim 16, wherein the measurement patterns are pseudo-random patterns.

18. The method of claim 16, wherein the samples of the second amplified signal include a set of samples corresponding to M of the measurement patterns, wherein the set of samples is usable to construct an N-pixel image representing the incident light stream, where M is smaller than N.

19. The method of claim 16, wherein the second gain is based on an estimate of a standard deviation of the electrical signal.

20. The method of claim 19, wherein said modulating the incident light stream is performed by a light modulation unit having N light modulating elements, wherein the standard deviation is determined according the expression $AVG/\sqrt{N}$, wherein AVG is the estimate of the average value of the electrical signal.

21. The method of claim 16, further comprising:
low-pass filtering the electrical signal to generate the adjustable baseline voltage.

22. The method of claim 16, wherein the one or more calibration patterns include a maximal light transfer pattern and a minimal light transfer pattern.

23. A system comprising:
a plurality light sensing devices configured to receive respective portions of a modulated light stream and generate respective electrical signals, wherein each of the electrical signals represents intensity of the respective portion of the modulated light stream as a function of time, wherein the modulated light stream is produced by modulating an incident stream of light with a sequence of spatial patterns;
a plurality of amplifiers configured to amplify respective input signals in order to obtain respective amplified signals, wherein a gain of each amplifier is controllable;
a plurality of analog-to-digital converters (ADCs), wherein each ADC is configured to sample the respective amplified signal in order to obtain a respective sequence of samples;
a plurality of switching subsystems, wherein each of the switching subsystems corresponds to a respective one of the amplifiers and a respective one of the ADCs, wherein each of the switching subsystems is configured to controllably select one of the following to be the input signal to the respective amplifier:
(a) the electrical signal from the respective light sensing device, or
(b) a difference signal representing a difference between the respective electrical signal and a respective adjustable baseline voltage.

\* \* \* \* \*